United States Patent
Hart

(10) Patent No.: US 10,471,330 B1
(45) Date of Patent: Nov. 12, 2019

(54) AUTOMATIC BALL PITCHING MACHINE

(71) Applicant: Thomas Joseph Hart, Fenton, MO (US)

(72) Inventor: Thomas Joseph Hart, Fenton, MO (US)

( * ) Notice: Subject to any disclaimer, the term of this patent is extended or adjusted under 35 U.S.C. 154(b) by 0 days.

(21) Appl. No.: 16/220,954

(22) Filed: Dec. 14, 2018

Related U.S. Application Data

(63) Continuation-in-part of application No. 15/941,923, filed on Mar. 30, 2018, now Pat. No. 10,322,328, which is a continuation-in-part of application No. 15/000,042, filed on Jan. 19, 2016, now Pat. No. 9,943,739, and a continuation-in-part of application No. 14/986,456, filed on Dec. 31, 2015, now Pat. No. 9,937,400.

(60) Provisional application No. 62/598,748, filed on Dec. 14, 2017, provisional application No. 62/098,698, filed on Dec. 31, 2014.

(51) Int. Cl.
*F41B 4/00* (2006.01)
*A63B 69/40* (2006.01)
*A63B 69/00* (2006.01)
*G05B 15/02* (2006.01)

(52) U.S. Cl.
CPC ........ *A63B 69/406* (2013.01); *A63B 69/0002* (2013.01); *G05B 15/02* (2013.01); *A63B 2069/0008* (2013.01); *A63B 2069/402* (2013.01); *A63B 2225/093* (2013.01); *A63B 2225/50* (2013.01)

(58) Field of Classification Search
CPC ........ A63B 69/406; A63B 69/408; F41B 3/03
See application file for complete search history.

(56) References Cited

U.S. PATENT DOCUMENTS

| | | | | |
|---|---|---|---|---|
| 2,696,204 A | * | 12/1954 | Gilgoff | A63B 69/408 124/41.1 |
| 3,757,759 A | * | 9/1973 | Haworth | A63B 69/408 124/7 |

(Continued)

OTHER PUBLICATIONS

Dr. Alan M. Nathan, Determining the 3D Spin Axis from TrackMan Data [online]. Department of Physics, University of Illinois, Sep. 7, 2011. Retrieved from the Internet: <URL: http://baseball.physics.illinois.edu/trackman/SpinAxis.pdf>.

*Primary Examiner* — John A Ricci
(74) *Attorney, Agent, or Firm* — Creativenture Law, LLC; Dennis JM Donahue, III; Kevin Staed

(57) ABSTRACT

A computer-controlled pitching machine in an operative connection with a controller interface controlled by the user, wherein the controller interface can connect with a variety of ball pitching machines and display pitch selection interfaces unique for the particular ball pitching machine. Based on the machine capability and the pitch selected by the user on the controller display, the computer-controller machine automatically pitches a ball according to control parameters determined in the controller. The controller may also include or be linked to a pitcher database wherein a user selection retrieves a saved pitch set for a particular pitcher and the system subsequently provides unique control parameters based on the attributes of the selected pitcher and throw parameters for a particular pitch. Further, the system described provides multiple methods of user input into the system for selecting, creating and saving pitches and pitchers.

20 Claims, 20 Drawing Sheets

(56) References Cited

U.S. PATENT DOCUMENTS

| | | | | |
|---|---|---|---|---|
| 4,197,827 A | * | 4/1980 | Smith | A63B 69/406 124/78 |
| 4,323,047 A | * | 4/1982 | McIntosh | A63B 69/406 124/1 |
| 4,352,348 A | * | 10/1982 | Griffith | A63B 69/406 124/34 |
| 4,423,717 A | * | 1/1984 | Kahelin | A63B 69/406 124/78 |
| 4,995,371 A | * | 2/1991 | Kuizinas | A63B 47/002 124/36 |
| 5,125,653 A | * | 6/1992 | Kovacs | A63B 69/406 124/78 |
| 5,464,208 A | * | 11/1995 | Pierce | A63B 69/406 124/78 |
| 5,649,523 A | | 7/1997 | Scott | |
| 6,182,649 B1 | * | 2/2001 | Battersby | A63B 69/406 124/78 |
| 6,470,873 B2 | * | 10/2002 | Battersby | A63B 69/406 124/78 |
| 6,539,931 B2 | * | 4/2003 | Trajkovic | A63B 24/00 124/32 |
| 6,546,924 B2 | * | 4/2003 | Battersby | A63B 69/406 124/78 |
| 6,820,605 B1 | * | 11/2004 | Suba | A63B 69/408 124/34 |
| 7,082,938 B2 | | 8/2006 | Wilmot | |
| 7,610,909 B2 | | 11/2009 | Greene, Jr. | |
| 8,550,063 B2 | * | 10/2013 | Alger | A63B 69/406 124/6 |
| 9,010,309 B2 | * | 4/2015 | Lewis | A63B 69/40 124/78 |
| 2002/0185120 A1 | | 12/2002 | Scott | |

\* cited by examiner

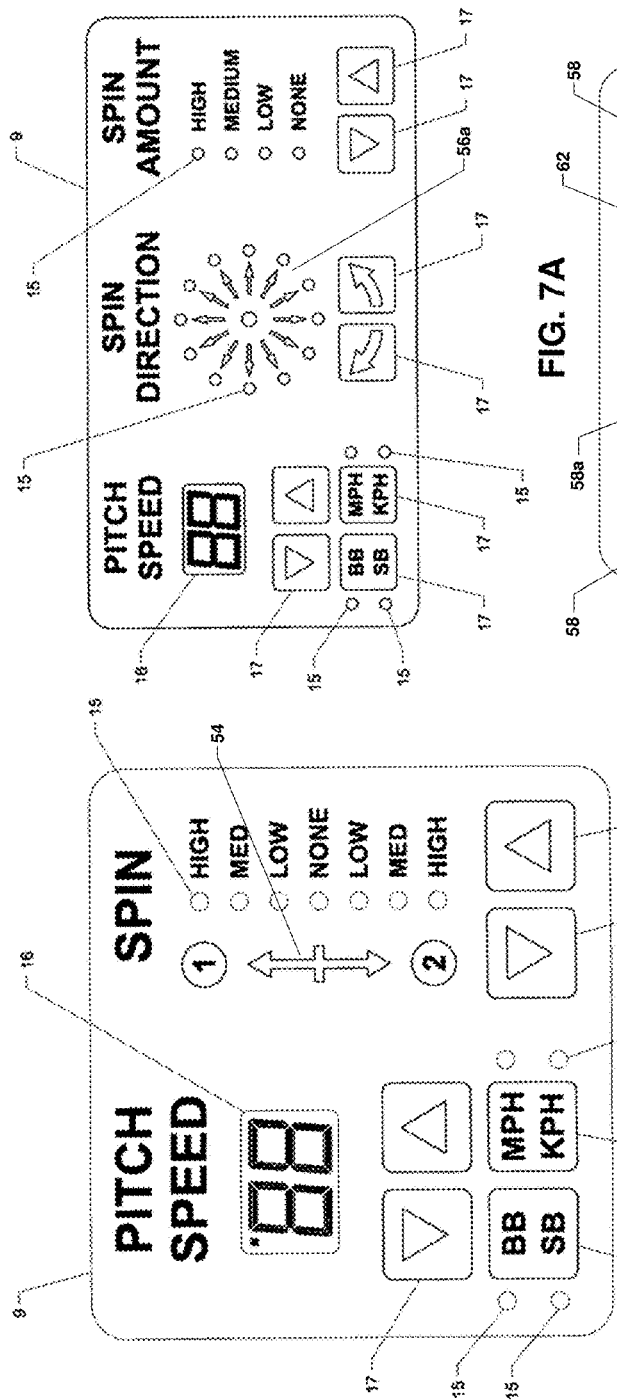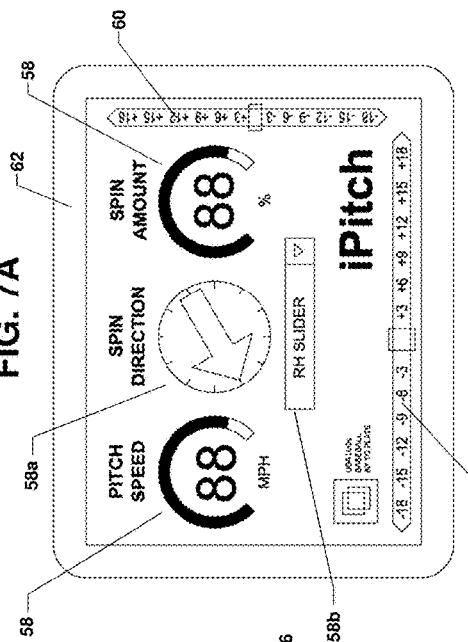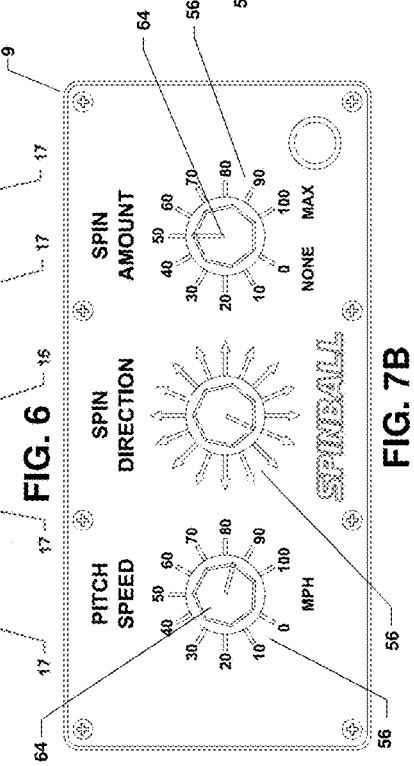
FIG. 7A
FIG. 8
FIG. 6
FIG. 7B

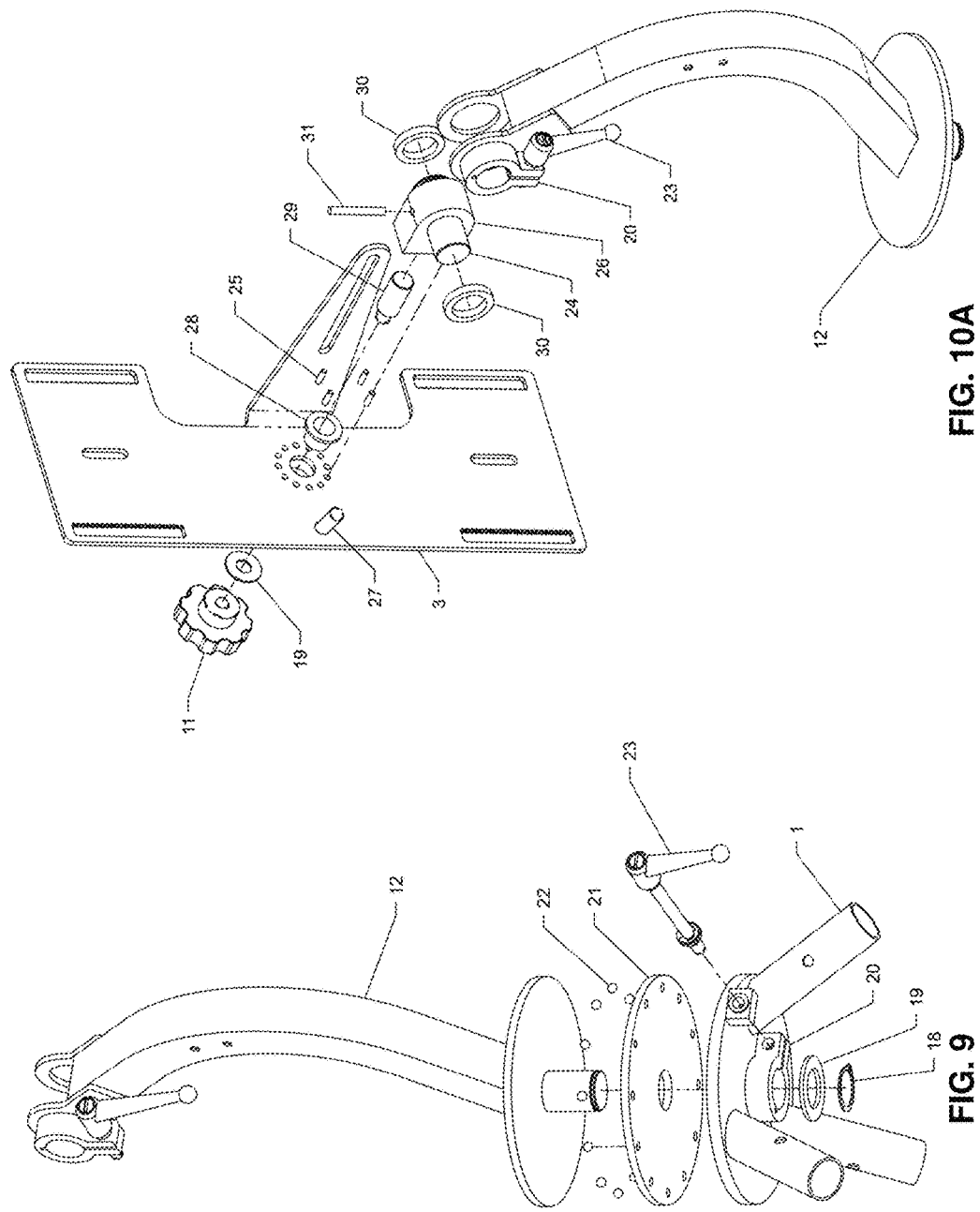

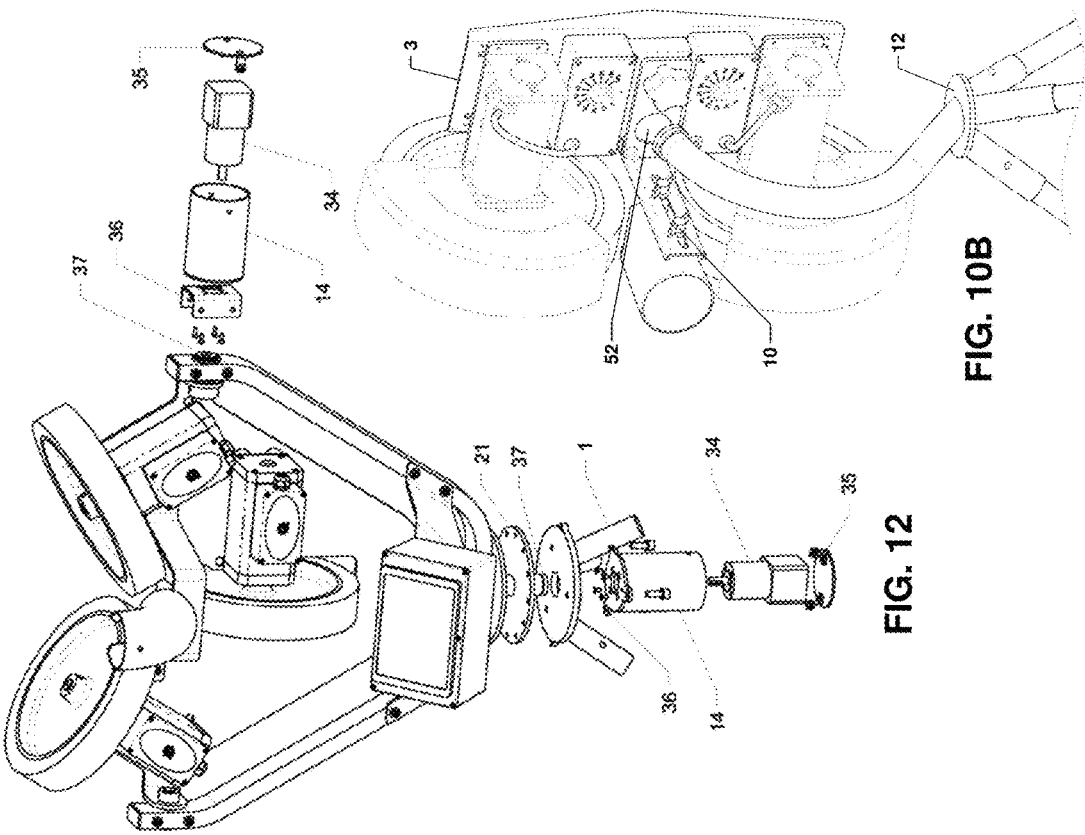
FIG. 10B
FIG. 12
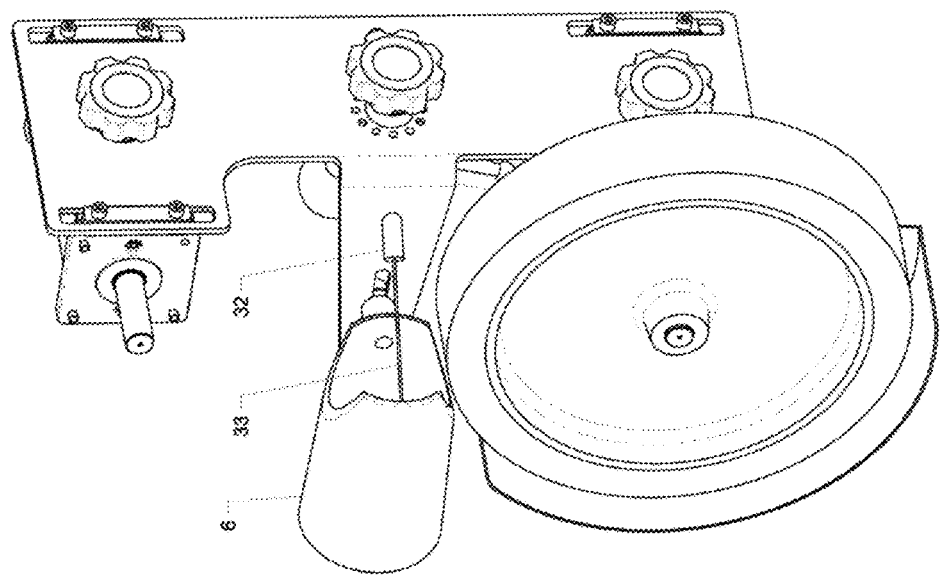
FIG. 11

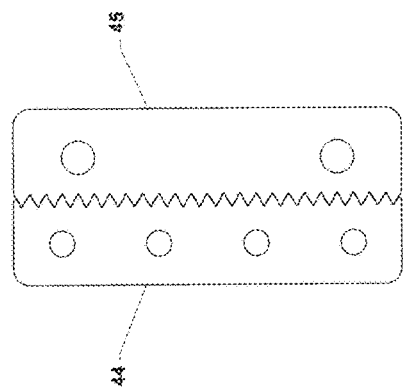
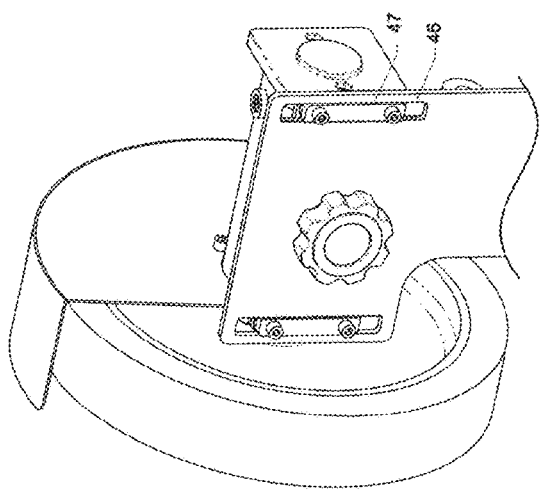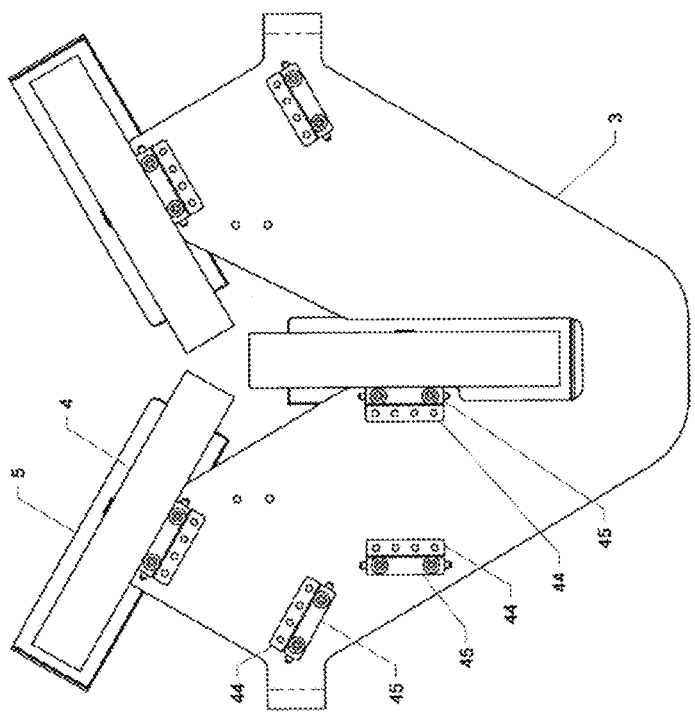

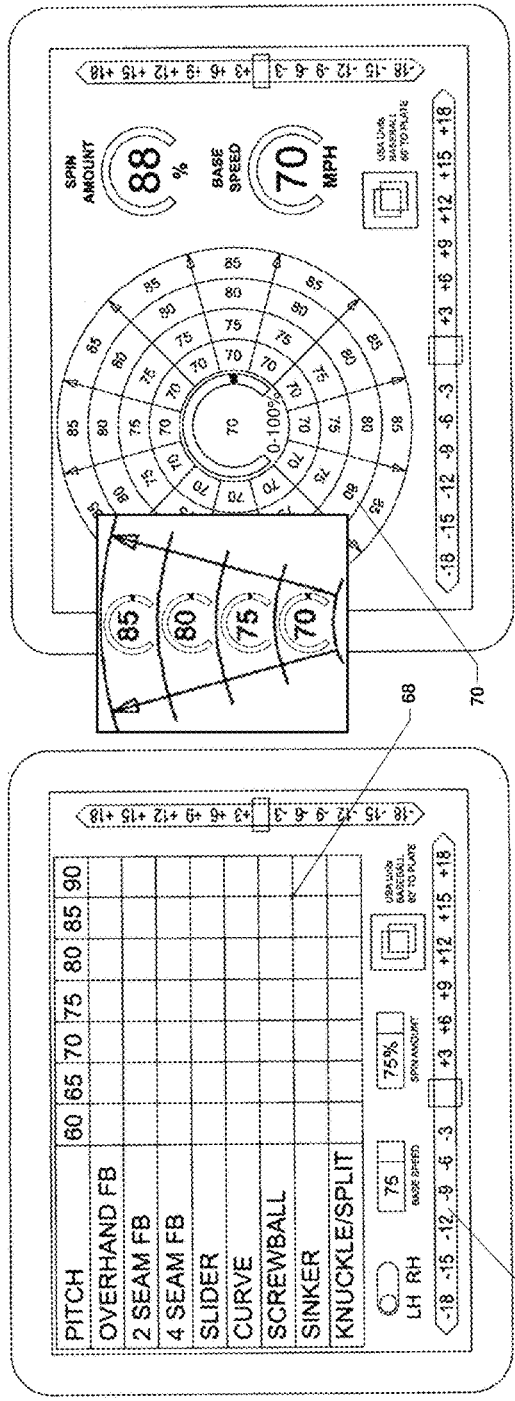
FIG. 22
FIG. 23
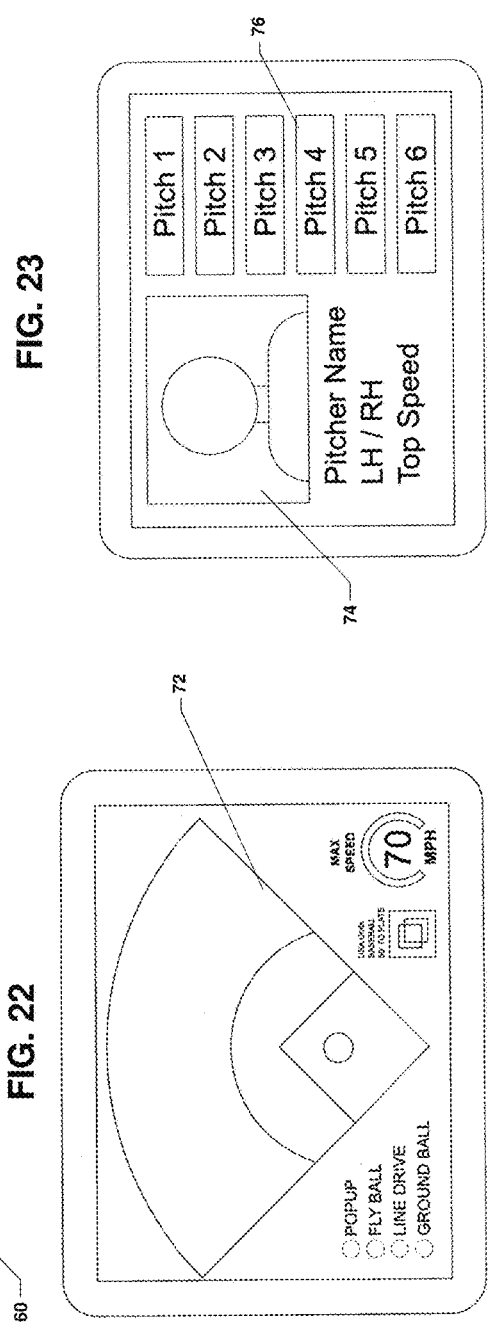
FIG. 24
FIG. 25

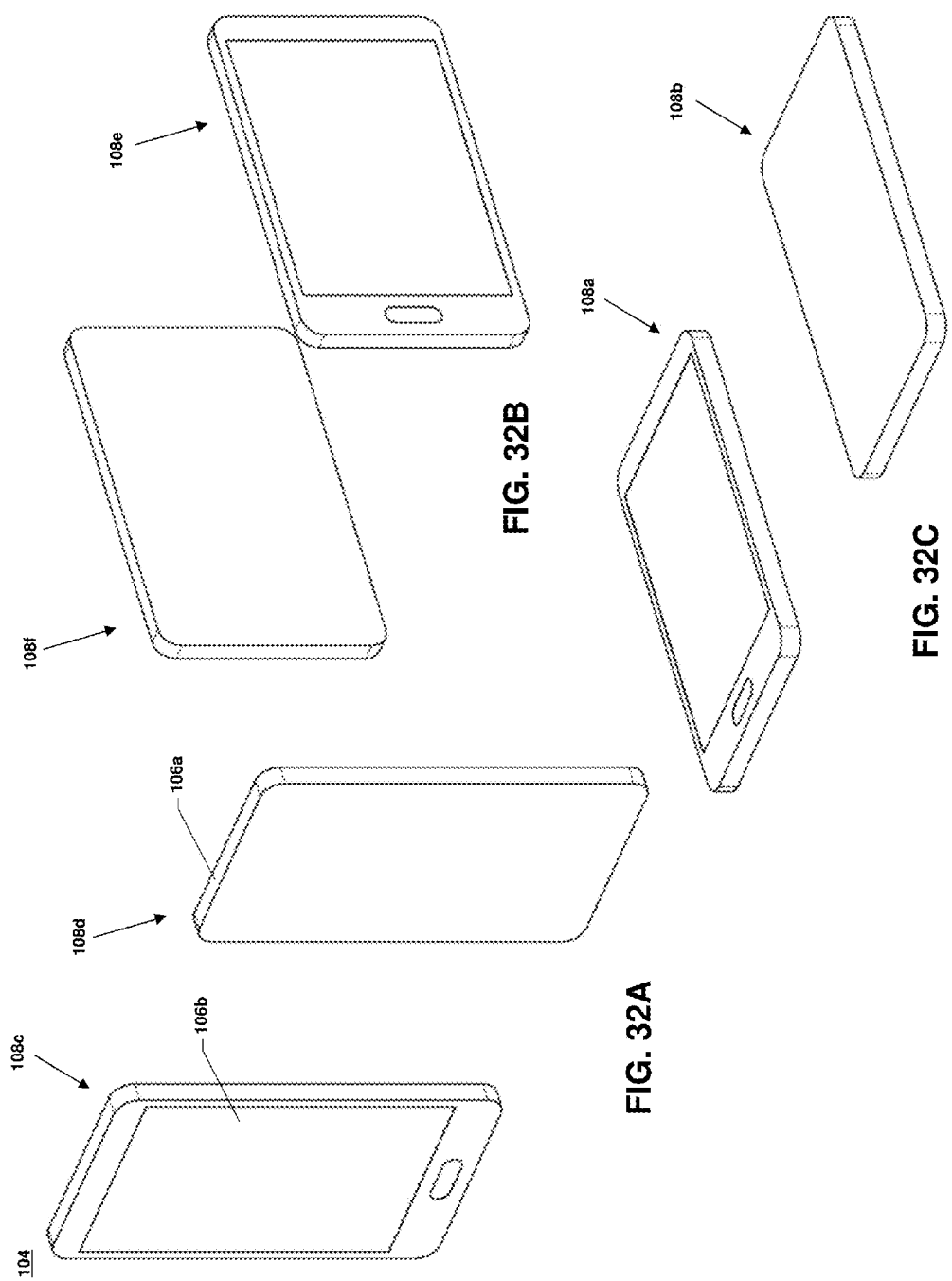

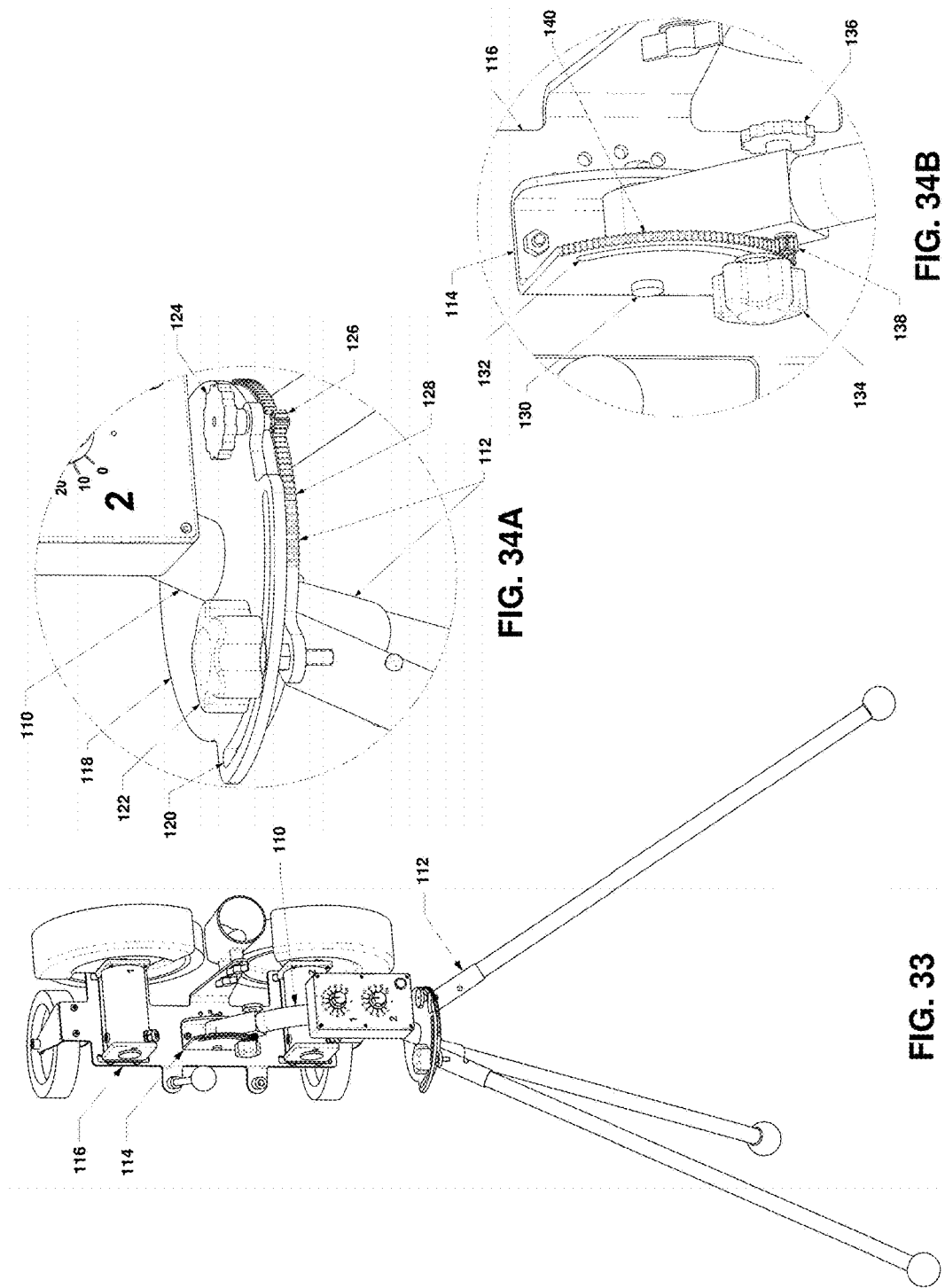

AUTOMATIC BALL PITCHING MACHINE

CROSS-REFERENCE TO RELATED APPLICATIONS

This application claim priority to U.S. Provisional Pat. App. No. 62/598,748 filed on Dec. 14, 2017 and is also a continuation-in-part of U.S. patent application Ser. No. 15/941,923 filed on Mar. 30, 2018 which is a continuation-in-part of U.S. patent application Ser. No. 15/000,042 filed on Jan. 19, 2016 and which is also a continuation-in-part of U.S. patent application Ser. No. 14/986,456 filed on Dec. 31, 2015 which claims priority to U.S. Provisional Pat. App. No. 62/098,698 filed on Dec. 31, 2014, all of which are incorporated by reference herein.

STATEMENT REGARDING FEDERALLY SPONSORED RESEARCH

Not Applicable.

APPENDIX

Not Applicable.

BACKGROUND OF THE INVENTION

Field of the Invention

The present invention relates to devices that launch or throw sports balls, such as ball pitching machines. More particularly, the invention relates to an automatic ball throwing machine particularly suited to throwing baseballs, softballs and batting practice balls, and the invention can be used with any substantially round ball that is propelled to a player, including soccer balls, tennis balls, cricket balls, lacrosse balls, basketballs, and other sports balls.

Related Art

There are ball throwing machines used in numerous sports that assist during the playing of a sport or enable players to practice certain aspects of a sport. One example of machines aiding in the playing and/or participation of a sport includes the use of game ball throwing machines. These machines are used to throw or launch the ball used in a particular sport.

For example, in a sport such as football, tennis, soccer, cricket, basketball, lacrosse, baseball, and softball, machines are used to launch, shoot, or throw a ball toward a player to facilitate or simulate the movement of that ball as it would typically occur during the playing of that sport. For example, in tennis, tennis ball machines are used to send balls to players during practice so they can work on their game techniques. In American football, football throwing machines are commonly used to simulate a quarterback's throw to allow receivers to practice catching the ball and may also be used with kick returners for simulating punts and kicks. This general concept of using machines to deliver a ball while simulating the movement of the ball as the ball would be delivered by a person permeates most sports.

One sport in particular, diamond sports such as baseball and softball, have a type of machine generally referred to as a pitching machine. This pitching machine is a game ball throwing machine that is used to simulate the throw of a ball by a pitcher. These machines are typically used in batting practice but can also be used to simulate a pitched ball for a catcher or a hit ball from a batter to assist players in the field to work on various fundamentals. While the subject claims of this application includes pitching for batting and throwing fielding practice, as well as for launching balls for other sports, for simplicity this multipurpose invention is herein defined as a pitching machine, and the location desired for the ball, whether into a batter's strike zone or into a fielder's position is defined as aim-point, impact point and target location and type.

Typically, these pitching machines have conventionally required a person, such as another player or coach, to stand beside the machine and manually adjust the aim-point, velocity and amount and direction of curve or spin in various directions. This is time consuming, dangerous to the person operating the machine, and does not simulate the typical time required for a human pitcher to throw pitches of different types in a game situation. This practice has evolved to the implementation of automatic ball pitch programmers. These machines in prior art involve a computer controller which is preprogrammed by the manufacturer using a standard database lookup table of values to throw a standard-type pitch with a preprogrammed velocity and direction and amount of spin, representing a type of pitch such as a curveball, fastball or slider. The drawback to this mechanism is it assumes a generic pitch by type, rather than the real-world situation in which all human pitchers have unique nuances, speeds, locations and amounts of spin for a given type of pitch. The second drawback is there is no ability to alter any parameters and have the ball delivered to a desired location on the plate. For example, a little league pitcher may throw a 50 MPH fastball that drops eight inches from release to arrival at the front of the plate, with a curve to the right of one inch, while a high school pitcher may throw a 70 MPH fastball that drops six inches in the same interval with two inches of curve to the right. The same two pitchers may throw their respective fastballs, and other pitches, differently as a strategy, or due to fatigue as the game continues. These subtle nuances are not simulated by prior art which utilize a set table of variables for each type of pitch.

Another drawback to prior art pitching machines is they do not enhance or emphasize a critical aspect to successful batting by a player, namely for the batter to focus on the ball as it is being released. While there is prior art which uses a warning light, pointed at the batter, to signify a ball is about to be launched, this does not simulate a real game situation. Since there is no 'wind-up' by a typical wheeled pitching machine, there has not been a prior reliable system to encourage, enable and allow the batter to focus on the ball at or near the point of release.

All machines require a method to adjust pitch location. There are many ways to adjust the aim of the machine, including moving the base structure, moving the arm mechanism relative to the structure, and changing the release point of the ball. Methods may be manual or automated depending on the particular embodiment, but numerous methods have been established in prior art of both pitching machines and mechanisms in general, such as gear trains, stepper motors, linear actuators, sprockets, belts, etc. However, all prior art has had numerous drawbacks, particularly in their failure to simulate the variety of pitches and the speed with which they vary, in a game situation.

What is needed then is an improved game ball throwing machine that easily and safely alters the aspects of various pitches and human pitchers actually encountered in a game, and that teaches a player to focus on and pick up visually a pitched ball at the moment it is released toward the batter. This improved game ball thrower preferably has multiple pitch parameters and easily interpreted graphical user interface is designed to avoid restricted pitch parameter options and limited interfaces that are prevalent in prior art ball feeding machines. This needed game ball throwing machine is lacking in the art.

A major factor in wheel pitching machine inaccuracy is the variance in the size and compressibility of the balls used. Laces can also cause a wide error in mechanized pitching, because there is no way to know how the laces will be positioned when the wheels grab it. Spring loading the wheels (or the motors if directly connected to the wheels) greatly reduces the machine's sensitivity to ball variance. It effectively lowers the spring rate of the existing fixed assembly, so that minor differences in ball size have a much lower effect on the clamping force between the wheels (or wheel and pad for a one wheel machine). For two wheel machines, the motors can be mounted on common linear shafts, with the shafts forming the base structure of the machine's frame.

SUMMARY OF THE INVENTION

A computer-controlled pitching machine in an operative connection with a controller interface controlled by the user, wherein the controller interface can connect with a variety of ball pitching machines and display pitch selection interfaces unique for the particular ball pitching machine. Based on the machine capability and the pitch selected by the user on the controller display, the computer-controller machine automatically pitches a ball according to control parameters determined in the controller. Although controller, including the display and user-entry port, may be connected via a hardwire to the computer-controller machine, the method described herein can be implement with a wireless controller, such as mobile phone, that allows remote control of the machine. In either case, the controller has various display formats that can be selected by a user and which display pitch selection methods dependent on user preference and machine capability.

Another aspect of the system and method describe herein includes linking the controller to a pitcher database wherein a user selection retrieves a saved pitch set for a particular pitcher and the system subsequently provides unique control parameters based on the attributes of the selected pitcher and throw parameters for a particular pitch. This iPitcher method provides an innovative means for defining realistic pitchers and a respective pitch repertoire wherein the control parameters are automatically updated based on a selected pitchers maximum pitch speed, maximum spin rate, and throwing style.

Further, the system described provides multiple methods of user input into the system for selecting, creating and saving pitches and pitchers. Although a standard graphical user interface (GUI), dials, sliders, buttons and other common user-entry ports may be used according to the methods described herein, a unique gross motion control system integrates orientation sensors and touchscreens found in mobile devices with a method of pitch selection. Accordingly, using these sensors in conjunction with, or instead of, the traditional touchscreen interface provides a number of benefits, including operating the machine without needing to look at the GUI on the screen.

A general object of the present invention is to provide a game ball thrower for delivering balls to a batter in a customized, user-selected or randomized pattern of spins, velocities and directions. Another object of the present disclosure is to provide an improved game ball pitching machine that enhances batter focus on the ball as it is pitched. Still another object of the present disclosure is to provide an automated game ball pitching machine interface that provides an easy to understand visual representation of the area above the home plate. Other and further objects, features and advantages of the present disclosure will be readily apparent to those skilled in the art upon reading of the following disclosure when taken in conjunction with the accompanying drawings.

BRIEF DESCRIPTION OF THE DRAWINGS

The present invention will become more fully understood from the detailed description and the accompanying drawings.

FIG. 6: Detail view of the two-wheeled pitching machine control panel.

FIGS. 7A and 7B: Detail views of the three-wheeled pitching machine control panels with membrane switches and knob switches, respectively.

FIG. 8: Detail view of an alternative control panel for the three-wheeled machine.

FIG. 9: Perspective detail view of the two-wheeled machine turntable.

FIGS. 10A and 10B: Perspective detail views of alternative two-wheeled machine pitch and roll adjustment mechanisms.

FIG. 11: Detailed view of the ball illumination means.

FIG. 12: Exploded detail view of stepper motors.

FIG. 17: Front view of the sawtooth motor locator.

FIG. 18: Detail view of the sawtooth.

FIG. 19: Enlarged perspective view the profiled block.

FIG. 22: Detail view of the rectangular grid HMI screen.

FIG. 23: Detail view of a composite polar grid HMI screen with a magnified view of a section of the grid.

FIG. 24: Detail view of a defensive-drill screen.

FIG. 25: Detail view of a HMI specific pitcher select screen.

FIGS. 32A-32C: Perspective views of various phone orientations.

FIG. 33: Perspective view of two wheel pitching machine with spur gear aim adjustment.

FIGS. 34A and 34B: Detail view of horizontal adjustment joint and vertical adjustment joint, respectively.

DETAILED DESCRIPTION OF THE PREFERRED EMBODIMENTS

Figure 1:
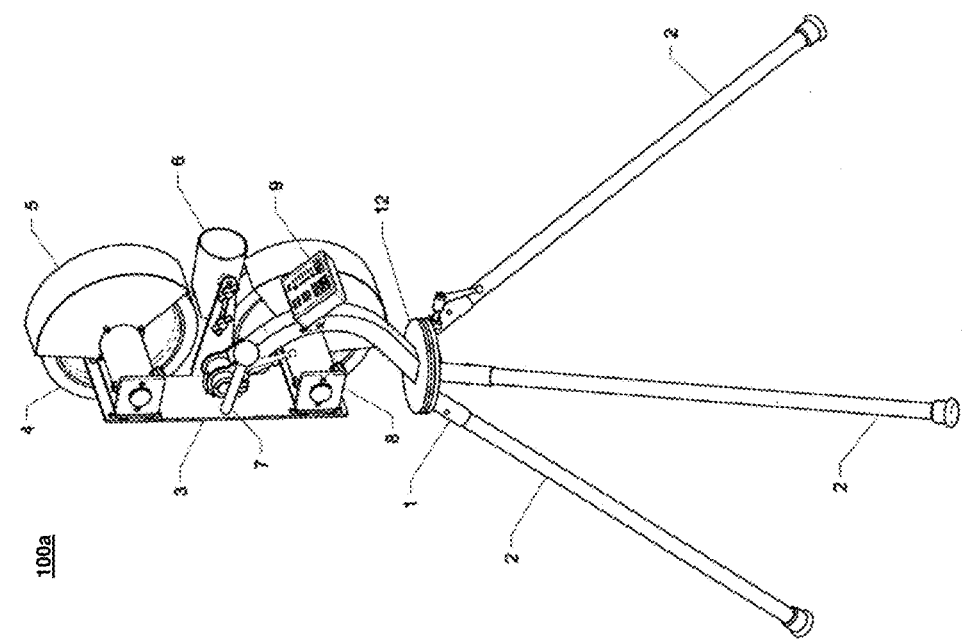
FIG. 1: Operator side perspective view of a two-wheeled pitching machine.

The following description of the preferred embodiment(s) is merely exemplary in nature and is in no way intended to limit the invention, its application, or uses As shown in the accompanying drawings referred to above, the game ball throwing machine 100 is a diamond sport ball throwing machine, such as for baseball or softball. Other throwing machines can be utilized, such as those for soccer, football, lacrosse, cricket, basketball, and the like, and are contemplated by this disclosure. Turning now to FIG. 1, the device includes a base means 1 such as the indicated tripod, comprising three or more interchangeable legs 2, motor mounting plate 3 securing one or more powered rotating wheel(s) 4 for propelling a round object such as a ball, forward or imparting spin or a combination of propulsion or spin.

In diamond sports, the game ball throwing machine 100 is generally described as a pitching machine. For simplicity's sake, the pitching machine term will be used to generally refer to any type of ball throwing machine throughout this description of the invention. The pitching machine 100 generally includes wheels 4 that spin and are used to impart force to the ball to project the ball towards a target. The wheels are driven by motors 8 which are adjusted and controlled by a series of user input controls 9. As explained below, a computer processor uses the user's pitch input parameters of pitch speed, spin direction, and spin amount to calculate the rotational wheel speeds for each of the wheels and translates the wheel speeds into signals that control the potentiometers for the motors of the respective wheels. The pitching machine has an intake opening 6 positioned and sized to receive a ball and deliver that ball to the wheels 4 for the pitching machine. The game balls (not shown) typically have two hemispheres wherein each hemisphere is engaged by one or more of the wheels 4 to impart the force to propel the ball to its target.

Around each wheel 4 is preferably a wheel guard 5. Located generally equidistant between the wheels is a ball feeder tube 6 for delivering the ball forward into the pinch point of the wheels 4. Preferably attached to the motor mounting plate is an interchangeable, removable handle 7 which may be used to manually adjust the vertical and horizontal primary aim-point of the two-wheeled pitching machine. Attached mechanically to the mounting plate 3, wheel 4 and guard 5 is a motor 8, control panel 9, motor clamping knob 10, two-wheeled system twist adjustment clamp 11, and rotating top frame 12. As explained in detail below, particularly with reference to the three-wheeled pitching machine, the computer processor can also be used with stepper motors 14, 34 to automatically adjust the vertical and horizontal aim-point. Generally, the computer processor uses the same pitch input parameters of pitch speed, spin direction, and spin amount that are used to calculate the rotational wheel speeds to also determine the trajectory of the ball, and with an input of the distance of the pitching machine to a target location, the computer processor can also calculate an aim-point for the selected pitch. The computer processor can compare the aim-point for the selected pitch with a reference aim-point, such as the calculated aim-point for the previous pitch, to determine a change in the initial trajectory of the ball and the corresponding change in the orientation of the machine that would be required for the ball to be delivered to the same aim-point as the previous pitch, and then provides control signals the stepper motors to accordingly aim the pitching machine. It will be appreciated that the automatic aiming could also be performed for the two-wheeled machine; since the plane of the wheels defines the axis of ball spin in a two-wheeled machine, to change the orientation of the spin axis on these machines, the section of the machine housing the wheels must be rotated, and this can be performed with the signals to the corresponding stepper motor controlling the plane of the wheels.

Generally, the pitching machine includes a base 1, a support frame 12 attached to the base, a drive mechanism attached to the support frame, and a control panel 9 with a computer processor that can be attached to the support frame or can have a wireless connection, such as through a tablet computer or smartphone screen. The base can be a base as known in the art that allows for height adjustment of the pitching machine with the game ball feeder. The drive mechanism can be those drive mechanisms known in the art, including various types of motors 8 that can run off AC power, DC power, or both, as desired. Additional details of the various aspects of the pitching machine according to the present invention are described below with reference to the accompanying drawings.

As illustrated in FIG. 1, a two-wheeled pitching machine 100a follows convention of a base tripod 1 with removable legs 2 supporting an upper frame structure 12 which pivots on a vertical (yaw) axis. There is a motor mounting plate 3 which pivots on a horizontal axis (pitch) with respect to the frame 12 allowing for vertical aiming. Motor plate also rotates on a second horizontal axis (roll), allowing the motor plate orientation to twist, or be rotated into any plane parallel to the vertical aiming axis. Motors 8 are fastened to the motor mounting plate in a manner that allows the gap between wheels 4 to be easily adjusted. The motors are preferably electric motors, and as explained below, the adjustment of the upper frame relative to the base and the adjustment of the motor plate relative to the upper frame can be performed through different types of rotating joints that are generally known for pitching machines. Wheels 4 and wheel guards 5 are directly attached to the motors 8 so they move with the motors as an assembly. The ball feed tube 6 is removable to allow for different ball sizes. Removable handle 7 provides the user a convenient place to grip the machine for adjusting its aim. Control panel 9 provides user a means for controlling the machine. Controls on the panel 9 allow user to control both wheel speeds and the aim of the machine.

Figure 2:
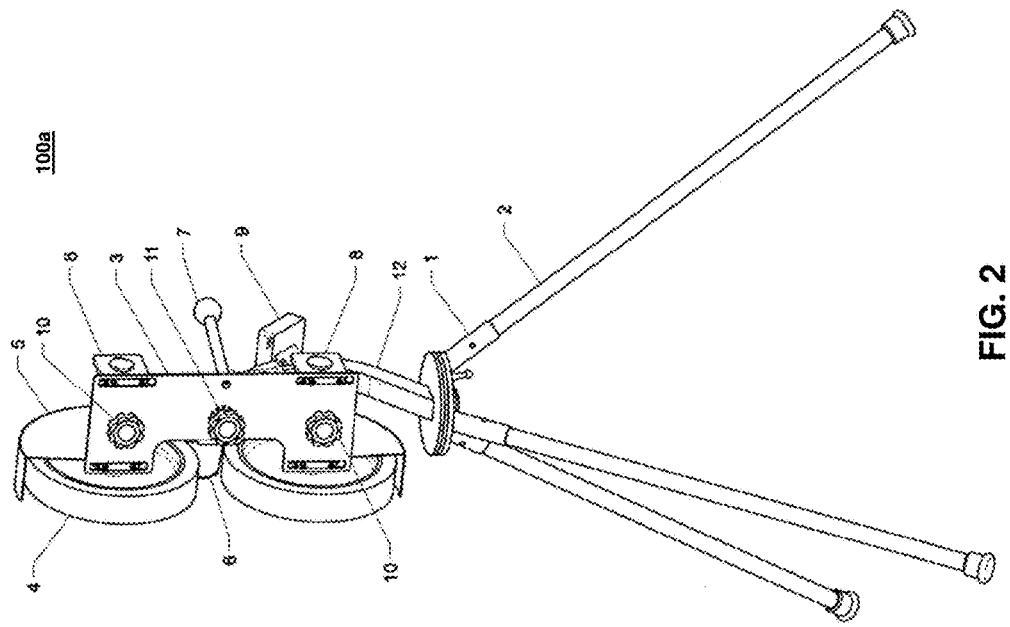
FIG. 2: Ball throwing side perspective view of the machine shown in FIG. 1.

As particularly illustrated in FIG. 2, motors 8 and wheels 4 are held in place on the motor mounting plate by threaded clamping knobs 10. A similar threaded clamping knob 11 holds the motor mounting plate 3 in place, providing a method for adjusting the roll angle of the machine.

Figure 4:
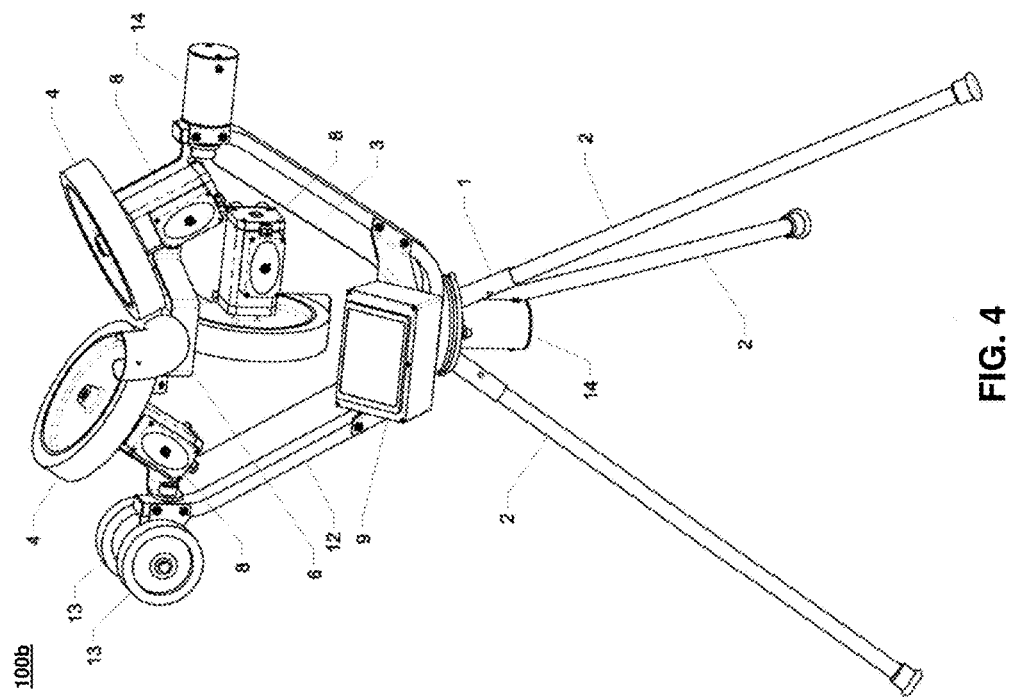
FIG. 4: Operator side perspective view of an automated three-wheeled pitching machine.
Figure 3:
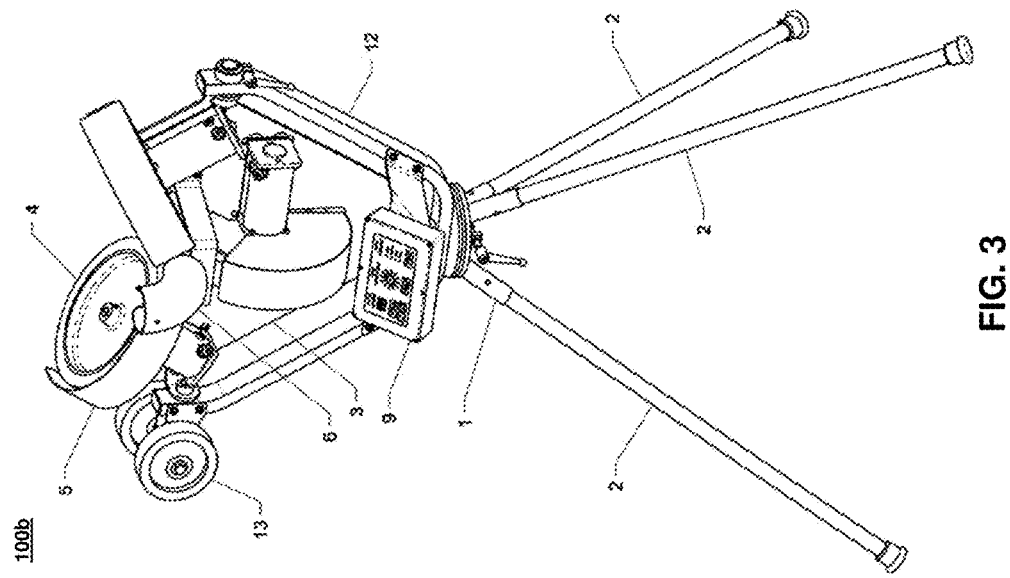
FIG. 3: Operator side perspective view of a three-wheeled pitching machine.
Figure 5:
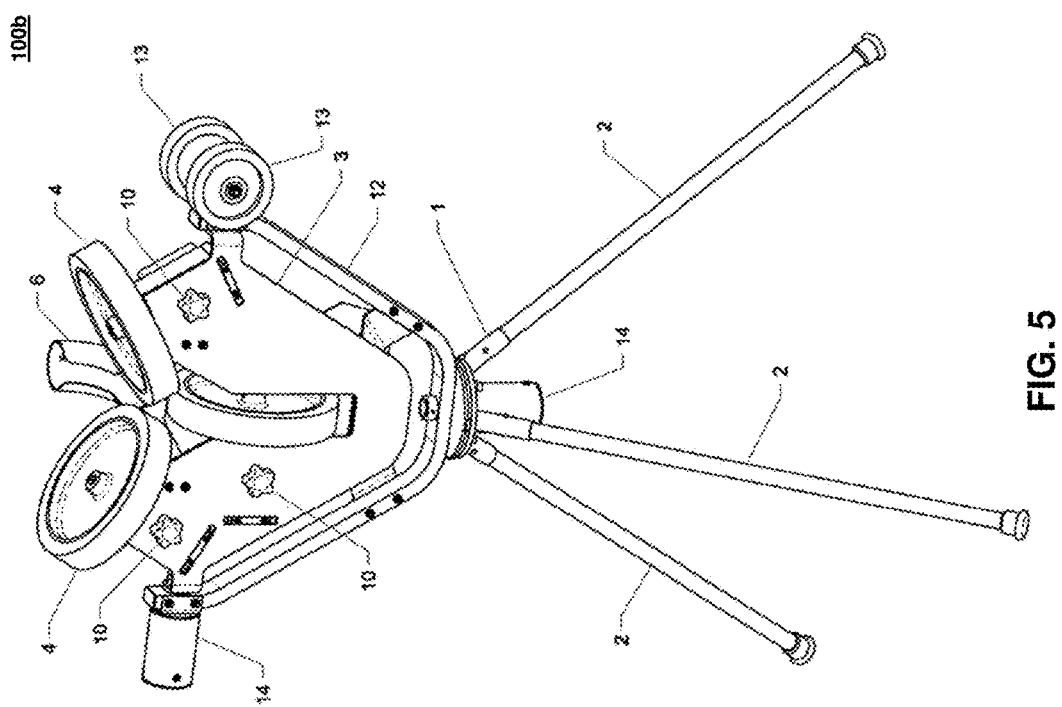
FIG. 5: Ball throwing side perspective view of the machine shown in FIG. 4.

The three-wheeled pitching machine 100b shown in FIG. 3 has the same concepts as the 2 wheel embodiment described above except there is no roll adjustment needed. As is generally known for pitching machines, the use of three wheels to propel the ball allows the differential speeds of the wheels to vary the spin axis of the ball in multiple planes without the need for a roll adjustment, whereas the two-wheeled pitching machine requires the roll adjustment because the differential speeds of a two-wheeled pitching machine with the axes of rotation of the wheels being parallel can only spin a ball with an axis of rotation that is parallel to the axes of rotation of the wheels. Removable transport wheels 13 have been added. A shown in FIG. 4, an automated three-wheeled pitching machine is includes stepper motor housings 14. Each stepper motor controls one aiming axis. The stepper motors are further described below with reference to FIG. 12. The computer processor is in operative communication with each one of the stepper motors to provide control signals for aiming the pitching machine. The back view of the three-wheeled pitching machine shown in FIG. 5 provides an alternate view of the features described above.

A two-wheeled control panel shown in FIG. 6 is a membrane switch panel with LED indicators 15 and seven (7) segment LED displays 16. A user controls the machine by pressing buttons 17 which are momentary switches that serve as selector units through which the users make their selections, and the corresponding signals for the selections are communicated to the computer processor. Graphics printed on the panel illustrate to the user how the panel works. In a two-wheeled machine in which the wheels are spaced apart directly opposite from each other, such as at 0 degrees and 180 degrees, and the wheels rotate in the same plane in opposite directions, the plane of the wheels defines the axis of ball spin, which can be either clockwise or counterclockwise, and the amount of spin placed on the ball is defined by the differential speed of the two wheels with respect to each other. Accordingly, for a two-wheel machine, a linear spin indicator representing the plane of the wheels can be used to graphically represent the direction of spin and the amount of spin in either direction. The control scheme is explained in detail later.

The three-wheeled control panel shown in FIG. 7A has the same concepts as described for FIG. 6, and the control scheme is also explained in detail below. Generally, as explained below, the wheel speeds are determined and controlled by a computer processor using wheel speed equations and the corresponding user inputs for the pitch variables in these equations, i.e., pitch speed, spin amount, and spin direction; the computer processor translates its calculated wheel speed results into control signals that it communicates to drives for the motors that rotate the respective wheels in order to control the wheel speeds. For the two-wheeled machines, the spin direction corresponds to the plane of the wheels and can be varied by different amounts in opposite directions according to this plane. Accordingly, as explained below, the control panel for the two-wheeled machines can have a simplified display in which the spin direction is a linear spin direction indicator 54 shown in opposite directions with the corresponding amount of spin. With the three-wheeled machines, the spin direction of the ball (and the orientation of the spin axis) produced by the wheels can be varied outside of a single plane without changing the orientation of the machine. Accordingly, the control panels for the three-wheeled machines preferably have a spin amount input with a separate spin direction input that is preferably arranged in a polar array 56 layout to indicate the direction in which direction the ball will curve.

The three-wheeled control panel shown in FIG. 7B has selector knobs 64 for the pitch input parameters. The indicators for the pitch input parameters are preferably a series of indicia on the control panel plate that are positioned in a polar arrangement 56 around each one of the selector knobs, and each selector knob preferably has a single pointer indicia that aligns with the corresponding indicia on the control plate identify the corresponding selection. Each selector knob connects to a rotary encoder or potentiometer within the control panel which communicates the corresponding signals for the respective selections to the computer processor. All of the control panels also have a pitch speed input that is preferably separate from the spin direction and the spin amount. However, as explained with reference to FIG. 23, it is possible to have a composite display in which the pitch speed, spin direction, and spin amount can all be simultaneously displayed on a single graphic image that allows a single-touch selection of all three (3) pitch input parameters. Additionally, it will be appreciated that rotary encoders and potentiometers could be used on the same control panel; for example, the control panel shown in FIG. 7B uses potentiometers for the speed and the spin amount and uses an encoder for spin direction. Accordingly, any type of the selector could be used for accepting the pitch input parameters.

In the present invention, the motor speed controls for the wheels preferably use a 0-5 volt analog input signal for communicating the target speed or set point to the corresponding motor drives. Digital potentiometers have been used to create the 0-5 volt analog signal from a microcontroller with no analog capability. It will be appreciated that new types of selectors can be used in place of analog or digital potentiometers. For example, rather than using digital potentiometers, new selectors can produce pulse width modulation (PWM) signals or other digital signals to create a simulated 0-5 volt signal so that the control panel microcontroller communicates directly with the motor drive through PWM.

A three-wheeled control panel adapted for a tablet computer or smartphone screen is shown in FIG. 8. The control panel consists of rotary slider widgets 58 for setting pitch speed and spin amount. Spin direction is set by rotating directional arrow widget 58a or by selecting a pitch name from the dropdown 58b. Horizontal and vertical aim are set by linear sliders 60. It will be appreciated that the control panels shown in FIGS. 6 and 7 could also be implemented with a touchscreen display 62 or on a wireless tablet computer or smartphone and may also include the linear sliders for setting an aim-point.

A two-wheeled turntable shown in FIG. 9 has a low friction disk 21 and stainless steel balls 22 that form a large turntable or thrust bearing, allowing upper frame member 12 to rotate freely relative to tripod base 1. A shaft clamp 20 is fixed to the base tripod 1 allowing a method for locking rotation of 12 when desired. Clamp handle 23 provides user easy access to partially hidden shaft clamp 20. Thrust bushing 19 and retaining ring 18 keep parts assembled without preventing rotation.

A two-wheeled pitch and roll adjustment is shown in FIG. 10A. Machine roll angle is set by rotating motor mounting plate 3 about shaft 29. Flanged bushing 28 allows free rotation of said motor mounting plate, and limited axial movement along said shaft. The shaft collar/clamp handle 23 connects to the shaft vertical aim adjustment means 24. One or more dowel pins 25 are connected to the clevis block 26, and a handle mounting stud 27 is provided on motor mounting plate 3. When clamping knob 11 is clamped down, dowel pins 25 engage in a circle of holes in the motor mounting plate 3 preventing unintentional rotation. Shaft 29 and dowel pins 25 are fixed to a clevis block 26 which is in turn, fixed to the pitch angle shaft 24 with dowel pin 31. Clevis block 26 and pitch angle shaft 24 rotate freely on ball bearings 30 mounted on upper frame member 12. A shaft clamp is fixed to the upper frame member 12 to lock pitch angle shaft 24 setting the pitch angle of the motor mounting plate. A handle 23 with a threaded stud, provides user with a convenient way to close the shaft clamp 20.

It will be appreciated that different types of adjustment mechanisms can be used with the innovations of the pitch machine according to the present invention. For example, an alternative pitch and roll adjustment mechanism is shown in FIG. 10B for a two-wheeled pitching machine. According to this alternative embodiment, the pitch and roll of the mounting plate 3 can be adjusted using a single ball and socket joint 52. The joint is locked by turning the clamping knob 10 clockwise until tight. To adjust the machine, a user can grasp the machine's frame 12 and turn the clamping knob counterclockwise until the joint is loose enough to move, and then the mounting plate can be rotated to the desired position where the joint is locked in place. Preferably, the joint is loosened just enough to adjust the mounting plate with a little effort, but not loosen it enough that it can flop around on its own. For horizontal adjustments, the ball and socket joint can be used, or a turntable can be used if there is one, or the entire machine can be rotated at the base legs.

A laser pointer/spotlight feature is illustrated in FIG. 11. A highly focused beam of light 33 is shot across the path of a ball to be thrown, by a laser pointer or small spotlight 32. The light beam is not visible to the hitter until a ball crosses its path. Because the beam 33 is located just before or in close proximity to the point where the ball is launched, the appearance of the beam on the ball acts as a visible indicator that a pitch is imminent or occurring. This light, or a subsequent light 32 could also be located some distance closer to the batter, to assist in timing of the pitch by the batter and enable the batter to better focus on the ball.

Details of the stepper motors are shown in FIG. 12. The motor mounting plate's yaw and pitch angles are set by geared stepper motors 34. Motors are protected by separate housings 14 which have removable covers 35. Stepper motors are mounted to the machine with brackets 36 that allow the use of common parts with machines that are aimed manually. Stepper motor shafts are keyed to transmit torque to hollow shafts 37. This design allows some axial play between the hollow shaft 37 and the stepper motor 34. This prevents any axial load from reaching the stepper motor and damaging it, while also minimizing tangential play that would affect accuracy.

Figure 14:
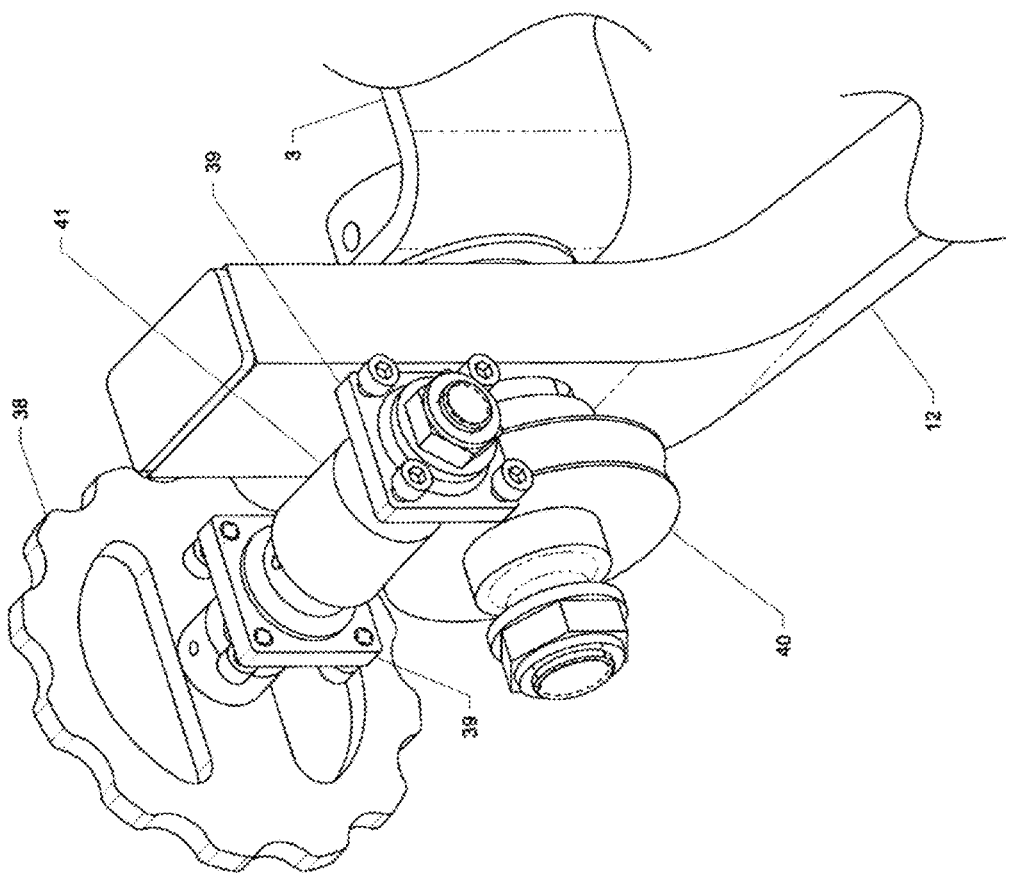
FIG. 14: Alternate perspective view of worm gears.
Figure 13:
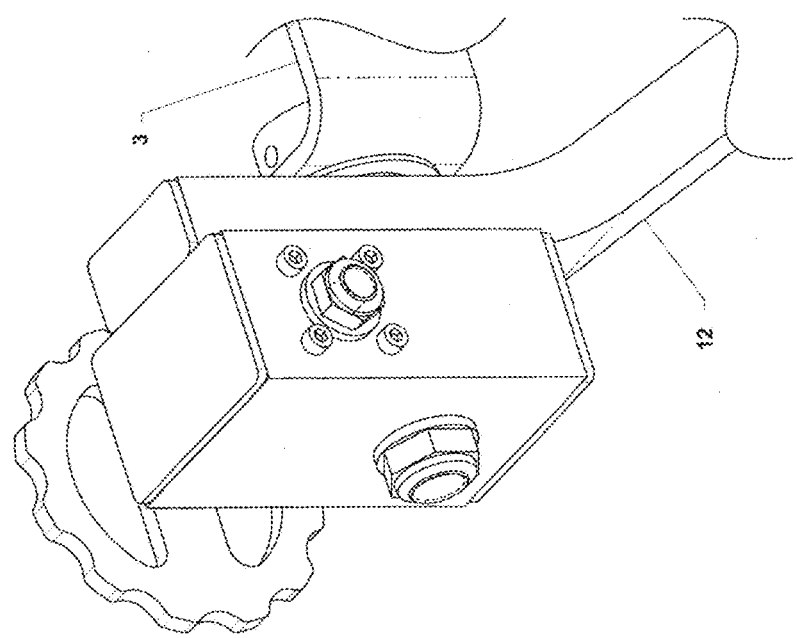
FIG. 13 Enlarged perspective view of worm gears.

As illustrated in FIGS. 13 and 14, worm gears provide a fixed, unchanging ratio between input rotation angle and output rotation angle, which a threaded rod arrangement such as the Sports Attack machine does not. The design is self-locking because it cannot be back driven. User turns hand wheel 38 which rotates the worm 41 inside mounted ball bearings 39. As the worm 41 rotates, so does worm gear 40. Worm gear 40 is attached to motor mounting plate 3 so turning the hand wheel 38 provides a highly leveraged, self-locking method of rotating the motor mounting plate 3 relative to 12, setting the pitch angle of the machine.

Figure 15:
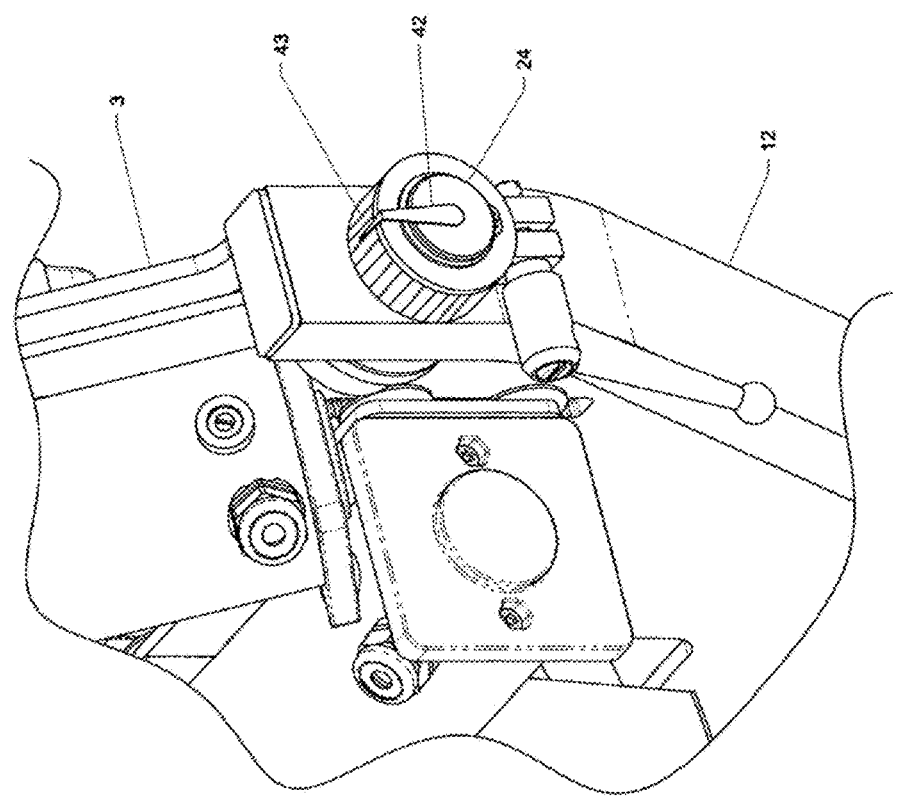
FIG. 15: Enlarged perspective view of an angle indicator

An angle indicator is particularly illustrated in FIG. 15. An indicating pointer 42 is attached to horizontal shaft 24 so that the pointer rotates with the shaft, and thus also the motor mounting plate 3. A visual scale 43 is added to the upper frame 12. As the machine's pitch angle is adjusted, the user is provided with visual feedback, informing them how far the machine has moved. A similar indicator can be added for horizontal adjustments.

Figure 16:
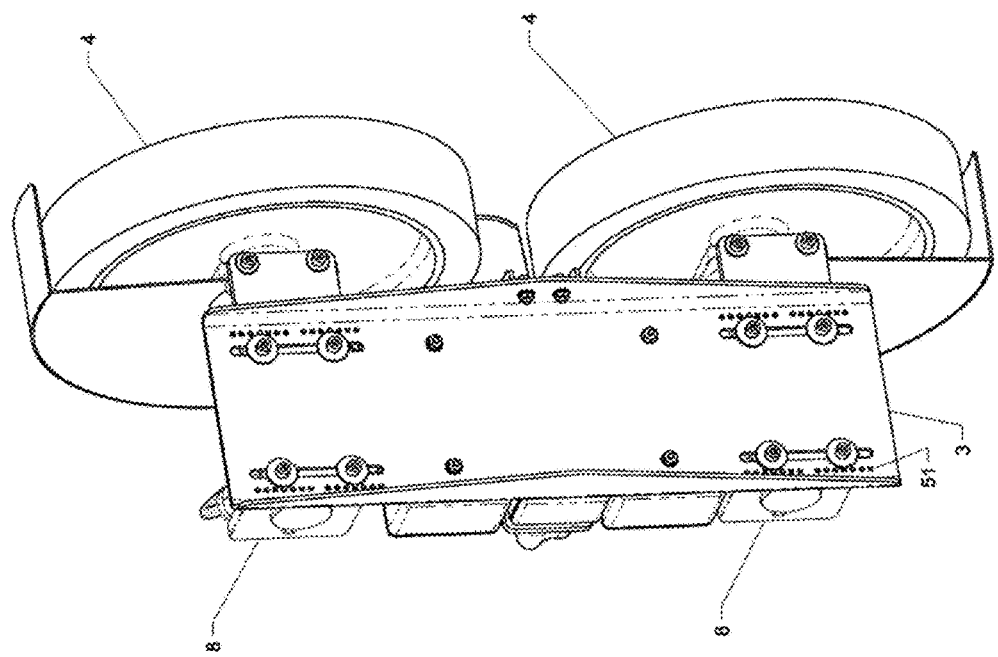
FIG. 16: Enlarged perspective view of the pegboard motor locator.

A pegboard motor locator is illustrated in FIG. 16. Motors 8 and thus wheels 4 can be repositioned to adjust the size of the gap between wheels. This is useful for resetting the machine for balls of different size and hardness. The pegboard design consists of a grid of holes 51 in the motor mounting plate 3 and dowel pins affixed to the motors 8. This provides a set of predefined motor and wheel positions for the user.

A sawtooth motor locator is shown in FIG. 17, and FIG. 18 shows a close up view of the sawtooth design. Sawtooth shaped plates 45 are affixed to the motors 8 and a mating set of sawtooth shaped plates 44 are affixed to the motor mounting plate. This provides a set of predefined motor and wheel positions for the user. The step size is reduced as compared to the pegboard design, which is limited by the size of the dowels, and the intersection of adjacent grid holes. FIG. 19 shows a profiled block as a variation of the sawtooth design in which profiled blocks 47 are affixed to the motors, and mating profiled pockets 46 are designed into the motor mounting plate 3. The concept is the same as the sawtooth, but reduces part count.

Figure 21:
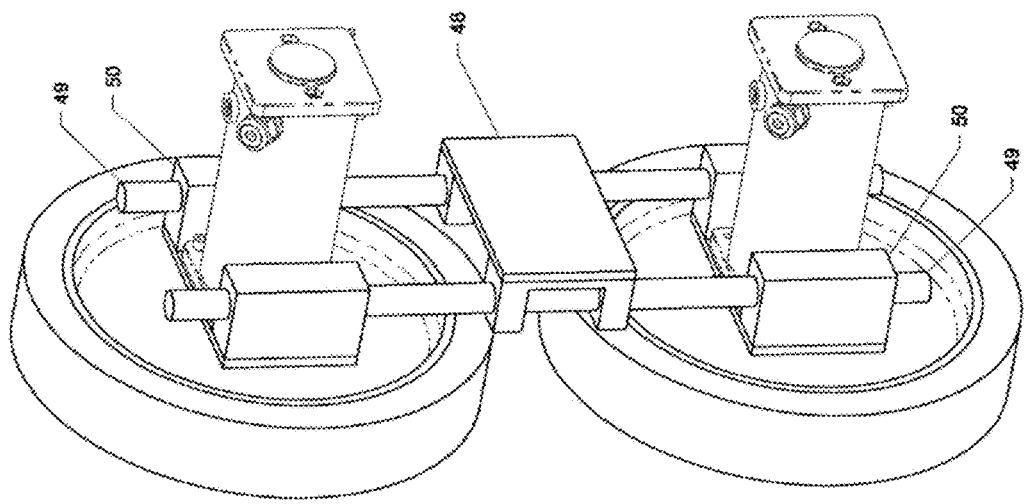
FIG. 21 Enlarged perspective view of the bearing means.
Figure 20:
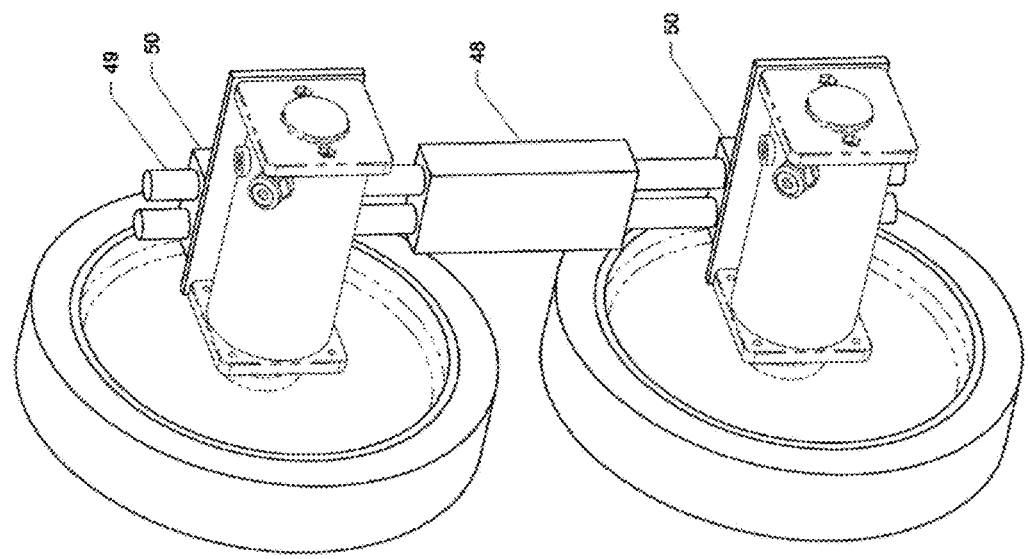
FIG. 20 Enlarged perspective view of the linear bearing machine.

FIGS. 20 and 21 illustrate a linear bearing machine in which the motor mounting plate is replaced with a parallel linear shaft system. Motors 8 and thus wheels 4 are mounted on linear bearings 50. The bearings slide on linear shafts 49 which are held in place by a fixed center block 48. As balls are fed into the wheels 4, the wheels are free to slide, expanding the wheel gap. This provides shock absorption and a longer contact time between ball and wheel. It also greatly reduces sensitivity to using balls of slightly different sizes or hardness. Expanding the range of motion allows the same basic design to be used for various sized balls of different sports. The motors may be spring loaded to return them to position after a ball has been thrown, but the inertia of the motor may in many cases provide the ball clamping force needed to properly grip the ball. The same basic two shaft layout may be used without the shock absorbing function by replacing one of the linear shafts with a shaft threaded half left-hand, half right-hand. As the shaft is turned, the motors would both move in or out from the center position. This provides a convenient way to quickly adjust the size of the ball gap.

FIG. 22 illustrates a human machine interface (HMI) screen display with a rectangular grid of pitches 68 that provides a multitude of pitches which can be selected by a single touch. As with the displays of the tablet computers and the smartphones, the HMI screen display is preferably a touchscreen which serves as a selector as well as a display. However, it will be appreciated that the HMI screen display could be operated on a laptop computer or desktop computer that may or may not have a touchscreen. Accordingly, in making selections using the HMI screen display, it will be appreciated that other HMI selectors could be used, such as a mouse or a trackpad or any other HMI device that allows the user to make a selection from the options presented on the HMI screen display, particularly including voice command.

FIG. 23 illustrates a HMI screen display with a polar grid 70 of pitches that provides a range of pitch speeds for each spin direction to simultaneously display a multitude of pitches which can be selected by a single touch. The spin amount can be selected with a separate slider, such as a rotary selector, or may be incorporated into each segment that defines a unique pitch speed/spin direction combination to allow for the single-touch pitch selection. In the detail view of FIG. 23, a section of the composite polar layout is shown with an example of a rotary spin amount selector that can be varied from 0%-100% within each one of the pitch speed/spin direction combinations that allows for the single-touch selection of all three (3) pitch input parameters. Accordingly, the composite polar layout provides a graphical representation of which direction the ball will curve in combination with the pitch speed and may also include the spin amount.

FIG. 24 illustrates a HMI screen display with a defensive screen 72. Place the machine at home plate, and a single touch positions the machine to throw the ball to the indicated location on the field. A user can select ground balls, fly balls, or line drives.

FIG. 25 illustrates a specific pitcher HMI screen display. Users can create custom pitchers 74, each with a picture, a top speed, and a set of pitches. Each of these pitches 76 can be customized to exactly match real or fictional pitchers using the same pitch input parameters as entered with the control panels or touchscreens generally described above, (i.e., pitch speed, spin direction, spin amount). Machines can be provided to customer with a library of these pitchers, or users can create their own. Because the machine aim according to the present invention is automatically calculated with acceleration equations based on the pitch parameters, the trial and error method of aiming the machine of prior art is eliminated.

As explained below and shown in the graphs of FIGS. 26A-26D, sets of horizontal acceleration equations and vertical acceleration equations for a range of pitch speeds have been developed for varying ball spin rates from no spin (0%) to the maximum spin (100%) and for different types of balls, such as a dimpled practice baseball and a low seam laced baseball. According to the innovative computing aspects of the present invention as described in detail below, the computer processor uses the pitch input parameters (i.e., pitch speed, spin rate, and spin direction) to determine the wheel speeds that will shoot the ball from the machine, and the computer processor also uses these same pitch input parameters to determine the horizontal and vertical acceleration equations that define the trajectory of the ball. With accelerations that define the trajectory and a known target distance to a target location, the computer processor can also calculate the aim-point for the pitch machine to the target location. The user can enter a target distance into the pitching machine, and the pitching machine's memory can also store standard target distances from the pitching machine to predefined target locations, such as the specified distance of sixty feet and six inches (60' 6") from the pitcher's plate on the pitching mound to the rear point on the home plate or forty six feet (46') for youth baseball or forty three (43') for softball. The computer processor translates the calculated wheel speeds into control signals that are communicated to the drives of the motors for the respective wheels, and the computer processor also translates the aim-point adjustments into corresponding motor control signals that are communicated to the motor controllers to aim the pitch machine.

Figure 27A:
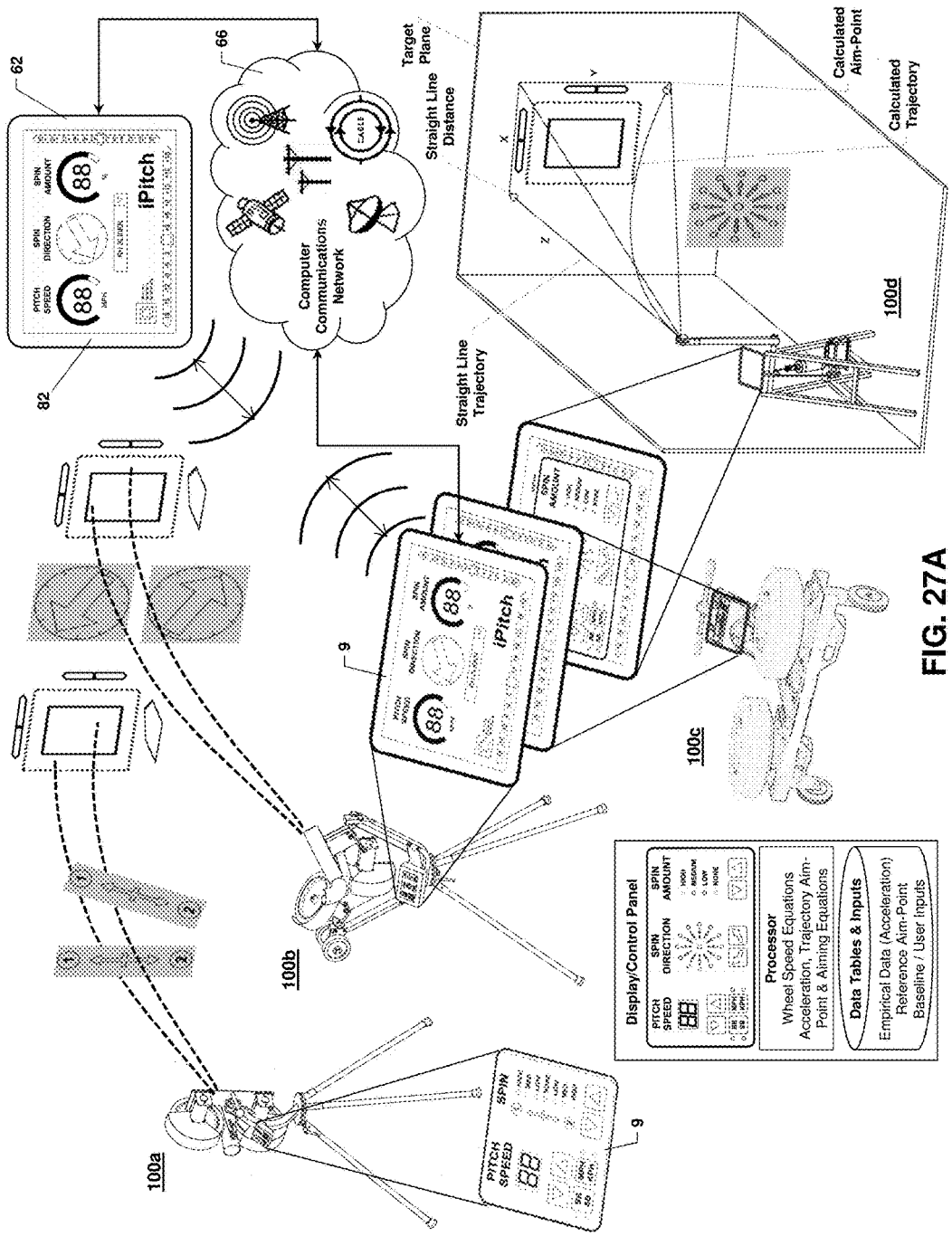
FIGS. 27A and 27B: Schematic diagram and flow chart of the system, respectively.

FIG. 27A illustrates a system diagram of optional pitching machines 100 according to the present invention with optional communication protocols between the control panel and the motors and their respective controllers that rotate the wheels and adjust the orientation of the wheels and the corresponding trajectory of the ball as it is initially shot out of the machine. As described above, the control panel 9 with the input controls and the computer processor can be attached to the pitching machine or there can be a wireless connection 66 between a processor and controllers on the machine and a tablet computer or smartphone that can serve as the control panel with the input controls and may also perform the calculations for the wheel speeds, acceleration, and aiming. Additionally, as indicated in the description of the various innovative features of the present invention, these features can be incorporated into other types of ball throwing machines 100, such as the soccer ball shooting machine 100c as well as the arm-type pitching machine 100d.

Figure 27B:
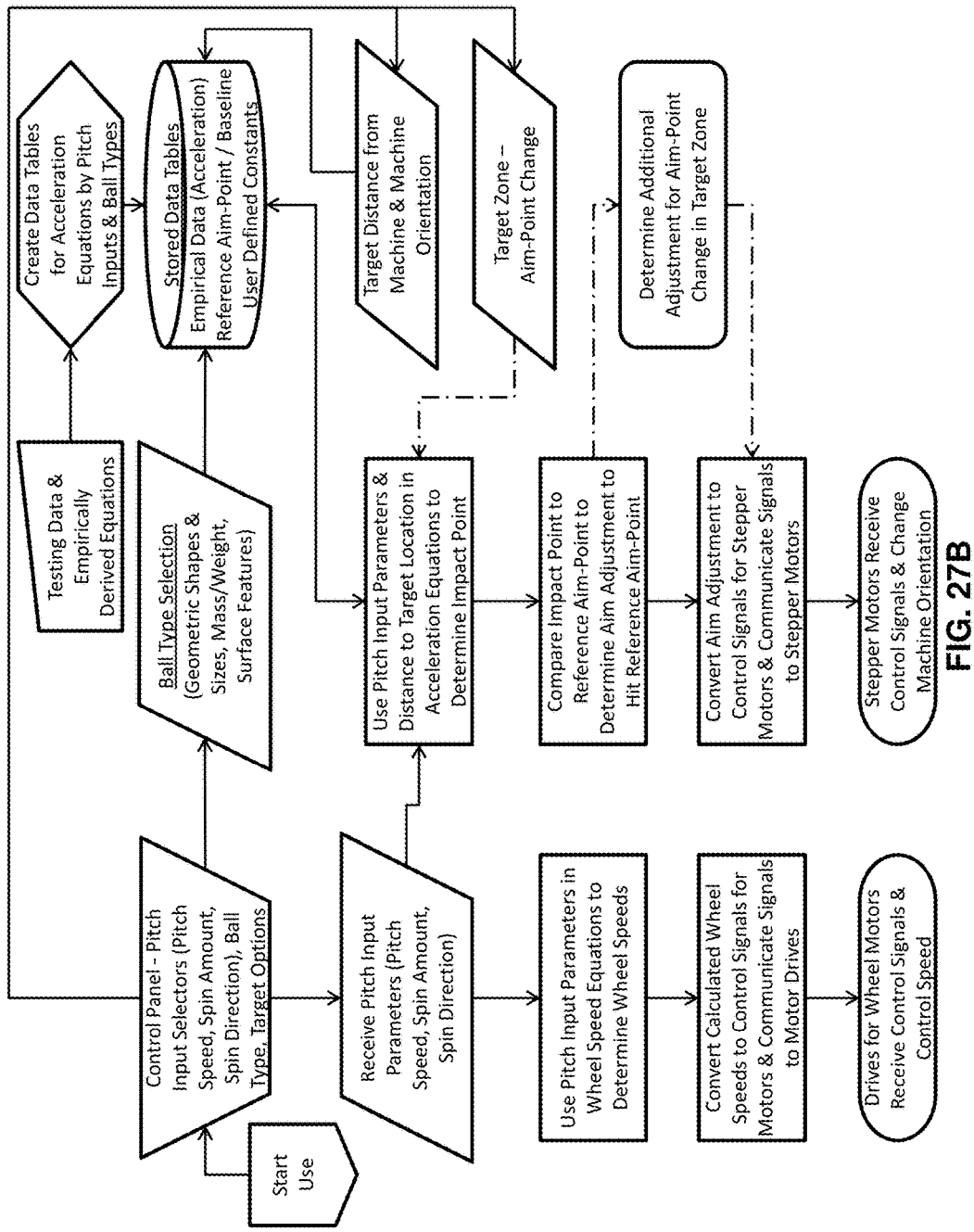

FIG. 27B illustrates the steps for the innovative methods of the present invention which is described in detail below. Generally, the present invention has a computer processor that uses pitch input parameters of pitch speed, spin amount, and spin direction for a selected pitch to calculate the rotational wheel speeds for each of the wheels and translates the wheel speeds into control signals that control the drives for the motors of the respective wheels. Additionally, with a given distance of a target location from the machine, the computer processor uses the distance in combination with the same pitch input parameters and a set of acceleration equations to determine an aim-point at the target location for the selected pitch. The computer processor can compare the aim-point for the selected pitch with the reference aim-point to determine the change in the orientation of the machine that would be required for the ball to be delivered to the same aim-point as the reference aim-point, and then provides control signals the stepper motors to accordingly aim the pitching machine. The equations can also be used with inputs for aim-point changes to make additional adjustments to change the aim-point for the selected pitch.

The use of the pitch speed, spin amount, and spin direction to determine the wheel speeds and the aim-point according to the present invention differs significantly from prior art pitching machines which control the machine settings (wheel speeds and orientation) using tables of the machine settings for predefined types of pitches (i.e. fastball, slider, curveball, screwball, knuckleball) at a range of speeds. These types of tables do not use any type of equation to calculate the trajectory for a pitch and would have no way to determine the changes required in the machine settings to make target location and aim-point adjustments unless these variations are stored in the tables. For example, for a given pitch, according to the prior art pitching machines, when a user wants to change the location of the aim-point from to different regions within a strike zone, the machine settings data for each region of the strike zone must be stored in the tables, but if the user wants to move the aim-point outside of the strike zone where there is no table entry, there is no way for the machine's computer processor to determine the appropriate settings. Similarly, if the user wants to move the aim-point to a particular spot within one of the regions, such as at a corner, the prior art machines have no way to provide this level of control. Additionally, the prior art machines are necessarily limited to the target distances that are used to develop the tables. In comparison, the present invention's use of the pitch input parameters to set wheel speeds and to also feed into acceleration equations that define the ball trajectories gives users the ability to vary pitches and aim-points in ways that were not possible according to the operations of the prior art machines. It will be appreciated that the control panels and computer processor of the prior art machines can be replaced with those of the present invention, and the electro-mechanical components of prior art machines would operate according to the innovative aspects of the present invention which is an entirely different principle of operation.

Low cost, commercially available microcontrollers and microprocessors are used to control the machine. The specific hardware used is not critical, but some possible selections are the Raspberry Pi, Beaglebone Black, or any similar device which supports web hosting or wireless communication either natively or with additional hardware, and provides GPIO (General Purpose Input/Output). Control signals and sensors interface to and control and sense the real-world and the hardware in a traditional manner. As generally explained above and described in detail below, one of the novel aspects of the present invention is the unique algorithm means within the system software which integrates the signals, sensors and hardware together with a unique and novel interface device.

The user interface can be accomplished with a panel or touchscreen mounted to the pitching machine or via a standard wireless touchscreen device, such as a tablet or smartphone, running a standard web browser, coupled with the novel software system of the subject invention. The invention can used with a web browser, or custom written application. The computer software program may be run on any wireless device and/or host device (Raspberry Pi, etc.). One can use VNC (virtual network communication) protocol to connect the wireless device to the host device.

The machine's control system includes a web server and wireless interface. The user loads the web pages hosted by the web server and controls the machine by manipulating the inputs shown on the interactive web pages. Through use of the unique software, it is also possible to create custom applications based on the touchscreen's operating system, for download from the internet.

There are several modes for the machine to operate in, so there are several specialized pages to load. Some of these modes are: machine setup, custom pitch, help, defensive drills, one touch pitch selection, and random sequence. The one touch screen provides a grid of buttons that set the machine for a large variety of pitches with a single touch to allow the fastest possible pitch selection. The random sequence mode allows users to select from a menu of available pitches at a range of pitch speeds. Users may select as many pitches from the menu as desired. Each mode includes tools for the user to select pitch location. The user interface can be used on any style of machine (wheeled, arm, air cannon) and is described in more detail later in this specification.

It can be difficult to make small adjustments to a typical pitching machine because they are so heavy and unbalanced, and the movements are so small. Some manufacturers have added worm gears or threaded rods to aid the user, but these are cumbersome, inaccurate and time consuming to adjust, resulting in a less than realistic simulation of a pitcher varying locations of his pitches to the batter during a game.

Two methods disclosed in the subject invention to remedy this shortcoming in the prior machines are: 1) adding geared (or ungeared) step motors to the adjustment mechanism and 2) adding a visible scale so the user has a reference to easily see how far they have moved the machine. The scale can be divided into units of distance as measured at the pitch's destination (typically home plate) as opposed to actual distance moved at the machine, for easier understanding by the user.

As mentioned earlier, an unmet need in the prior art was to teach batters to focus on the ball as it is pitched, versus a light shining toward the batter as in prior art. Even when the ball is visible from a distance, it is not obvious to a hitter the exact time that ball will be thrown by a pitching machine. A localized light source at the ball's exit, illuminating the face of the ball visible to the batter, provides a visual cue to the batter that the pitch is being thrown and drawing attention to the ball. Existing machines have warning lights to indicate an imminent pitch, but the design of the subject invention results in a benefit unanticipated by those skilled in the art, in that it allows the hitter to focus on the ball itself, not an indicator off to the side. A related improvement could also entail additional lights, possibly of different colors placed along the ball's path shining on a portion of the ball, which can be used as a timing aid.

A pitching machine must have a user interface of some kind to allow a user to control the machine. Most wheeled pitching machines provide individual motor speed controls for each wheel, typically a manually turned rotary potentiometer. While flexible, this method does not make it obvious to the user how to throw each type of pitch, or even how fast it will be. Several manufacturers resort to tables of values as a guide for the user to set manually, but these are cumbersome and can't cover all available pitches. Other manufacturers have added push button control, where users select a pitch by name and a speed, and the wheel speeds are set automatically. The downfall here is that pitch names are not universal, and again, not every pitch the machine could throw is selectable.

The subject invention disclosed herein, allows users to explicitly set a pitch speed, spin direction, and spin amount. Ball spin translates into the curve or break of a pitch. All three settings can be continuous or discrete amounts. The interface shown in FIG. 7A shows twelve (12) spin directions and four (4) spin amounts, but any number may be used. For example, the interface shown FIG. 6 only has two (2) spin directions with three (3) spin levels in each direction plus a no spin setting, whereas the interface in FIG. 7B has sixteen (16) spin directions and eleven (11) spin levels, and the interface in FIG. 8 could be allow for any polar spin direction and any level of spin amount between 0% and 100%, inclusive. Generally, the input parameters of the system according to the present invention provide users with a method to easily select any possible pitch, even if they don't know what it is called.

Selecting a pitch by name can provide a convenient, although limited method of user input. This new system can be extended to include pitch names as an alternative input method. If a pitch is selected by name, the corresponding spin direction is still displayed for confirmation. If a direction is selected, the corresponding pitch name is displayed for confirmation, such as shown by the screen in FIG. 8. Accordingly, the input parameters of the system according to the present invention can also provide consistency between the two methods of selecting a pitch.

On one and two wheeled pitching machines, the plane of the wheel(s) defines the axis of ball spin. To change the orientation of the spin axis on these machines, the section of the machine housing the wheels must be rotated. By mounting the spin direction and/or amount displays on the rotating section, a simplified display may be used, such as the linear spin indicator shown in FIG. 6. The orientation of the spin axis is defined by the wheel orientation, so when the machine rotates with the roll adjustment, the display preferably rotates with it, keeping the display at the correct orientation. It will be appreciated that the direction of the ball spin relative to the axis of spin rotation can be clockwise or counterclockwise depending on the relative speed differential between two wheels and which wheel is spinning faster, or in the case of a single-wheeled pitching machine whether the wheel itself is rotating clockwise or counterclockwise. Accordingly, the simplified display shows the spin direction relative to the plane of the wheels and the axis of the ball spin and the relative spin amount in either direction.

For one and two wheel machines, the display can also be located on the fixed portion of the machine, but the adjustable section must still be rotated either manually, or automatically by the control system, to match the selected spin direction. If the rotation is manual, the control system can feature a graphical display showing the user how to orient the machine for the selected pitch.

As an obvious variation to the disclosed novel invention, one can also add a feature to change the displayed units of velocity (miles per hour or kilometers per hour, for example) as selected by the user.

Another shortcoming in the prior art is the inability to quickly adjust for differences in balls. At a given wheel speed, a heavier ball will be thrown at a slower velocity than a lighter ball. By adding an input selection for type of ball (baseball or softball, for example), the displayed pitch speed can be corrected, based on the weight of the ball selected.

The user interface described above provides a benefit not realized before by those skilled in the art of pitching machines. The software and hardware configuration of the subject invention provides users a simple, direct method for specifying pitch parameters on any type of machine. These input parameters can easily be used to calculate the individual wheel speeds required to generate the selected pitch.

Because the user may not be familiar with amount of spin used with typical pitches, (RPM of an average curveball, for example), it is convenient to select a maximum reasonable spin amount, say 3000 RPM, 3600 RPM, or some other ball spin rate suitable for the balls being delivered, and let the user select a percentage of that maximum amount. For calculation, it is also convenient to express the spin amount setting as tangential wheel speed difference. For example, a 25 mph difference on a two wheel machine set to throw a pitch of 50 mph would give tangential wheel speeds of 25 and 75 (50+/−25).

For arithmetic calculations, a frame of reference or coordinate system must be defined for spin direction. It is convenient to select the vertical direction to be 0 degrees, with angles increasing in a clockwise direction, as seen by the machine operator.

On a multiple wheel machine with inputs, wheel speed is calculated as set forth below.

PS=pitch speed
ANG1=direction of spin measured as an angle
SPNPCT (or SPINAMOUNT)=amount of spin, a percentage of the maximum tangential wheel speed difference
MAXSPIN=maximum tangential wheel speed difference for each wheel positioned at an angle, ANG2
tangential wheel speed, WS, may be calculated as provided in the equation below:

WS=PS−SPNPCT*cos(ANG2−ANG1)*MAXSPIN

So for the three (3) wheel machine shown in FIG. 9, with wheel angles of 60, 180, and 300 degrees, the respective wheel speeds are calculated according to the corresponding three (3) equations listed below.

WS1=PS−SPNPCT*cos(60−ANG1)*MAXSPIN

WS2=PS−SPNPCT*cos(180−ANG1)*MAXSPIN

WS3=PS−SPNPCT*cos(300−ANG1)*MAXSPIN

For a two (2) wheel machine, the wheel angles are 0 and 180 degrees, simplifying the equations as listed below.

WS1=PS−SPNPCT*MAXSPIN

WS2=PS+SPNPCT*MAXSPIN where the ball spins towards the slower wheel. It will be appreciated that in the two-wheel machine, either wheel can be selected as the slower wheel so that the ball may be spun in opposite directions. Generally, according to the present invention for multi-wheel pitching machines, wheel speeds are calculated with the wheel speed equations and the corresponding user inputs for the variables in these equations, i.e., pitch speed, spin amount, and spin direction.

A computer program written in C for a three (3) wheel machine was included in a separate attachment to the provisional application, and is also a part of the file wrapper for this application's parent non-provisional patent application as an appendix, both of which are incorporated herein by reference. This program takes digital inputs from the switches, such as shown in FIG. 7A and controls the multiple LEDs also shown in FIG. 7A to create a display indicating pitch speed, spin direction, and spin amount. The program can receive these same input parameters from the other types of user interface panels, such as shown in FIGS. 6, 7B, 8, 22, and 23 but for the display panel of FIG. 7B, the polar position of the indicia on the rotating knobs as aligned with the indicators on the face of the panel indicate the selections of pitch speed, spin direction, and spin amount, and similarly for the display screen of FIG. 8, the graphically displayed widgets show these same input parameters. The program also writes values or otherwise translates the input parameters into control signals that the computer processor communicates to drives for the motors that rotate the respective wheels in order to control the wheel speeds.

Other prior art pitching machines have used tables of values obtained by trial and error to aim their machines. These values are programmed by either the manufacturer or the user, but always by trial and error for a predefined set of pitches that have been tabulated according to the pitching machine hardware, such as the wheel speeds and the horizontal and vertical angles of the machine, so the prior art machines were not able to calculate aim-points for pitches as in the present invention's computer processor which uses acceleration calculations based on the pitch speed, the spin rate, and the spin direction. This limits the available number of pitches in the prior art machines. The inventive system disclosed herein is different. The achieved goal by this invention, lacking in the prior art, is to modify the aim of the machine automatically using acceleration equations for the ball based on the pitch speed and spin rate as well as the spin direction so that no matter how the pitch is changed by the user (speed, curve direction, or curve amount), the ball ends up in the same place when it crosses the plate. Whenever a pitch is changed, the present system can adjust for the change according to the steps listed below.

1) The pitch trajectory of a ball for a selected pitch is calculated using acceleration equations based on the pitch input parameters of pitch speed, spin amount, and spin direction, giving data for the theoretical impact point, $X_{sp}$ and $Y_{sp}$, at a particular distance, Z, from the pitching machine according to the given orientation of the machine. As explained in detail below, $X_{sp}$ and $Y_{sp}$ can be calculated for different types of balls in a number of ways using acceleration equations with the user entering the inputs for the variables of distance (Z) pitch speed, spin amount, and spin direction, i.e., $X_{sp}$, $Y_{sp}$=$f_{Acc}$(Z, pitch speed, spin amount, spin direction).

2) The theoretical impact point of the selected pitch ($X_{sp}$, $Y_{sp}$) as calculated by the acceleration equations is compared to the theoretical impact point of the previously selected pitch as the reference aim-point ($X_{ref}$, $Y_{ref}$).

3) The machine's aim is adjusted by changing the orientation of the machine to adjust the ball's initial trajectory of the selected pitch to account for the difference in the selected pitch's theoretical impact point from the reference aim-point, so that each pitch will impact the same point.

Impact point may be adjusted manually, but it will affect all pitches. Impact point, or selected aim-point with the pitch parameter inputs, is the horizontal and vertical target location of a pitch as it crosses the plate. According to the present invention, the horizontal and vertical components of the selected aim-point at the target location can be adjusted within in a target zone by user input of the slider selectors as shown in FIGS. 8, 22, and 23, and the additional slider calculations operate with the aiming steps summarized above to automatically alter the trajectory of the ball to change the corresponding aim-point. The slider selectors are shown as a linear horizontal slider and a linear vertical slider in the illustrations with positive and negative deviations from a set reference aim-point (0±X, 0±Y), such as the previous pitch, which is beneficial to the aiming process of the present invention which operates according to a difference in the horizontal and vertical location for the calculated impact point of a selected pitch from the reference pitch's aim-point which may intentionally not be set at the center of the target zone.

It will be appreciated that the setup mode of operation for the pitching machine may allow the user to set an absolute reference aim-point, such as the center of a strike zone, and rather than having horizontal and vertical sliders, the graphic display could show the strike zone with a buffer target zone around the strike zone. In such a system, the user input could be a particular region within the strike zone or somewhere in the buffer zone, and the determination of the machine orientation will be based on a differential from the orientation at the setup aim-point to an orientation that will produce the selected aim-point. It will also be appreciated that in some sports, it may be beneficial to use a polar coordinate system to define a target zone rather than the rectangular target zone that is particularly described and shown in the current embodiments. It will also be appreciated that for different types of ball throwing machines, the acceleration equations may use a different reference aim-point and differential distances to the desired aim-point. For example, with a football throwing machine that may simulate a kick or pass of the football, the horizontal location of the ball's endpoint can be set as a constant at the shoulder height of an average player, and the computer processor would use the acceleration equations to determine the velocity and orientation of the machine to deliver the football to a specified location on the field (i.e., an aim-point in a receiver's route or an aim-point for a returner's catch) that has a distance and angular position from the machine.

The following includes all variables used, their definition, units, and how they were derived-hard numbers defined by the hardware, user inputs, and calculated values. The variables and formulae disclosed herein are preferably resident within the unique nonobvious software program used in the subject ball pitching machine invention's computer processor that receives the input parameters, performs the calculations for the automatic aiming determinations, and provides the control signals to the drives for the motorized spinning wheels and stepper motors, and are herein referred to as arithmetic formulae for simplicity, and serve as full disclosure of the claimed methods for the software as it is run on the computer processor. As indicated above, the software can run on a computer processor that is a part of the ball pitching machine, such as the processor operating within the control panel or touchpad display, or on the computer processor of the wireless devices, such as a tablet computer or smartphone. Further explanations of the variables, input parameters, and calculations are provided below.

| VARI-ABLES | DESCRIPTION | UNITS | ORIGIN | INPUT | NOTES |
|---|---|---|---|---|---|
| Maxspin | max ball spin | RPM | constant | 750 | |
| Stepsize | step per pulse | degrees | constant | 0.0383 | 0.03829787 |
| pitchspeed | pitch speed | mph | user input | 72 | |
| Z | distance to plate | ft | user input | 55 | |
| spinangle | ball spin angle | degrees | user input | 90 | 0 = up, CW is positive |
| spin-amount | % of max spin | % | user input | 50 | |
| CLift | coefficient of lift | in/(s^2 * RPM * mph^2) | user input | 0.00003 | non-standard definition of CLift |
| spin-amount RPM | ball spin amount | RPM | calculated | 375 | |
| acc-x | horizontal acceleration | in/s^2 | calculated | 58.32 | |
| acc-y | vertical acceleration | in/s^2 | calculated | −386.40 | gravity = −386.4 |
| T | time in flight | s | calculated | 0.52 | |
| X | horizontal distance | inches | calculated | 7.91 | |
| Y | vertical distance | inches | calculated | −52.41 | |
| ang-x | horizontal angle | degrees | calculated | 0.69 | |
| ang-y | vertical angle | degrees | calculated | −4.54 | |
| xstep | hor steps | steps | calculated | −18 | left < 0 |
| ystep | ver steps | steps | calculated | 119 | down < 0 |

Acceleration, Aim-Point & Automatic Aiming Calculations $$\text{spinamountRPM} = (\text{spinamount}/100) * \text{maxspin}$$

$$\text{acc-}x = \sin(\text{radians}(\text{spinangle})) * \text{spinamountRPM} * \text{CLift} * \text{pitchspeed}^2$$

$$\text{acc-}y = \cos(\text{radians}(\text{spinangle})) * \text{spinamountRPM} * \text{CLift} * \text{pitchspeed}^2$$

$$t = z/(1.4667 * v)^2$$

$$x = 0.5 * \text{acc-}x * t^2$$

$$y = 0.5 * \text{acc-}x * t^2$$

$$\text{ang-}x = \text{degrees}(\arctan(x/(z*12)))$$

$$\text{ang-}y = \text{degrees}(\arctan(y/(z*12)))$$

$$\text{xstep} = -\text{int}(\text{ang-}x/\text{stepsize} + 0.5)$$

$$\text{ystep} = -\text{int}(\text{ang-}y/\text{stepsize} + 0.5)$$

Slide Adjustments for Changing Aim-Point in Target Zone

| xslide | horizontal distance | inches | user input | 6 |
|---|---|---|---|---|
| yslide | vertical distance | inches | user input | 12 |
| ang-xm | horizontal angle | degrees | calculated | 0.52 |

-continued

| ang-ym | vertical angle | degrees | calculated | 1.04 |
| xstepm | hor steps (manual) | steps | calculated | 14 |
| ystepm | ver steps (manual) | steps | calculated | 27 |

Slider Calculations for Changing Aim-Point in Target Zone ang-$xm$=degrees(arctan($x$slide/($z$*12)))

ang-$ym$=degrees(arctan($y$slide/($z$*12)))

$x$stepm=$x$int(ang-$xm$/stepsize+0.5)

$y$stepm=−int(ang-$ym$/stepsize+0.5)

Nomenclature Descriptions maxspin—The maximum wheel speed difference used to spin the ball, measured in RPM. Ball spin is created by spinning the throwing wheels at different speeds. It is an arbitrary value used to ease pitch specification by allowing users to specify spin by percentage instead of RPM.

stepsize —the step angle of the aiming stepper motor, including any gears pitchspeed—pitch speed z—distance from machine to plate spinangle—direction of ball spin spinamount (or spnpct)—amount of ball spin as a percentage of maxspin CLift—coefficient of lift, a value used to calculate the ball's acceleration perpendicular to its travel from spinning. Based on ball spin and velocity. Not the same as the general engineering term. Can be user adjusted to account for air density and ball condition.

spinamountRPM—calculated value of ball spin in RPM acc-x—horizontal acceleration acc-y—vertical acceleration, includes gravity t—calculated time in flight x—calculated distance ball moves horizontally during flight y—calculated distance ball moves vertically during flight ang-x—angle ball moves horizontally during flight ang-y—angle ball moves vertically during flight xstep—number of stepper motor steps to sweep ang-x ystep—number of stepper motor steps to sweep ang-y xslide—horizontal distance adjustment measured at impact point yslide—vertical distance adjustment measured at impact point ang-xm—angle adjustment to cause xslide distance adjustment ang-ym—angle adjustment to cause yslide distance adjustment xstepm—number of stepper motor steps to sweep ang-xm ystepm—number of stepper motor steps to sweep ang-ym The use of equations to directly calculate the horizontal acceleration and the vertical acceleration based on a fixed coefficient of lift for a spinning ball according to the Magnus effect is not entirely accurate. The force, or acceleration for a given mass, produced by the Magnus effect (i.e., the "Magnus acceleration") can be estimated by the general equation listed below. In this equation, CLift is a user adjusted constant, spinamountRPM is ball spin in RPM, and pitchspeed is the pitchspeed in MPH. As indicated in the table above, CLift is not used in its classical definition, but is empirically defined by the user. For example, CLift would change to adjust for different types of balls, such as the different mass (directly corresponding to different weights for different types of balls), different geometric shapes (spherical like a baseball and softball or ovoid like a football or rugby ball), different sizes (baseball size or softball size) as well as different surface features for balls having the same geometric shapes, size dimensions and mass (i.e., smooth, dimpled, or laced), and atmospheric conditions. This empirical definition also compensates for inconsistency in the units used to define the pitch, ie MPH and RPM.

Magnus acceleration=CLift*spinamountRPM*pitchspeed^2

As evident for the acc-x and acc-y equations above, the Magnus acceleration value is broken into horizontal and vertical components based on the direction of the spin, i.e., the spin angle, and a constant gravitational acceleration is added to the vertical component. With the acceleration being estimated as constant during the entire flight time of the pitch, aiming can be calculated using the classic physics equation for displacement with constant acceleration (i.e., x=x0+v0t+0.5at^2). Although useful, this method for aiming is not completely accurate where it assumed Magnus acceleration was linearly proportional to the ball's spin rate and to the square of the ball's speed and does not consider drag forces at all. Additionally, this aiming method ignores the effect of recoil on machine aim, which varies with pitch speed and ball weight. When the ball is thrown, a reaction force is transmitted through the machine's structure; the machine doesn't slide due to friction between the base and the ground, but the flexibility in the machine's structure causes the pitch angle of the machine to tilt up slightly. The faster that the ball is thrown, the greater the reaction force and the greater the change in the recoil pitch angle. Accordingly, simplifying assumptions that do not account for the complex interactions of varying acceleration, drag, and recoil effects produce calculations from the equations which do not fully match observed results from the machines. By using experimentally determining values for acceleration are various pitch speeds, these effects are integrated into the derived aiming calculations.

There are different ways to correct for these simplifying assumptions while still using calculations for acceleration in aiming the machine. For example, an effective coefficient of lift ($CLift_{eff}$) could be tabulated for different types of balls as well as different speeds and spin rates, i.e., $CLift_{eff}$=f(ball type, pitch speed, spin rate). The $CLift_{eff}$ function or table would account for increased recoil at higher speeds as well as the drag effects at different speeds. It will be appreciated that $CLift_{eff}$ could be a comprised of a baseline CLift for each type of ball ($CLift_{bl}$) that may be selected according to its mass, geometry, dimensions, and surface features, and a correction factor ($F_{Corr}$) could be applied to $CLift_{bl}$ based on the pitch speed and spin rate for a given type of ball ($CLift_{eff}$=$CLift_{bl}$(ball type)*$F_{Corr}$(pitch speed, spin rate). Similarly, it may be possible to construct a single acceleration equation for each ball type that accounts for variations according to different pitch speeds, i.e. acceleration=f(pitch speed, spin rate), in which pitch speed becomes an independent variable in the equation.

Figure 26A:
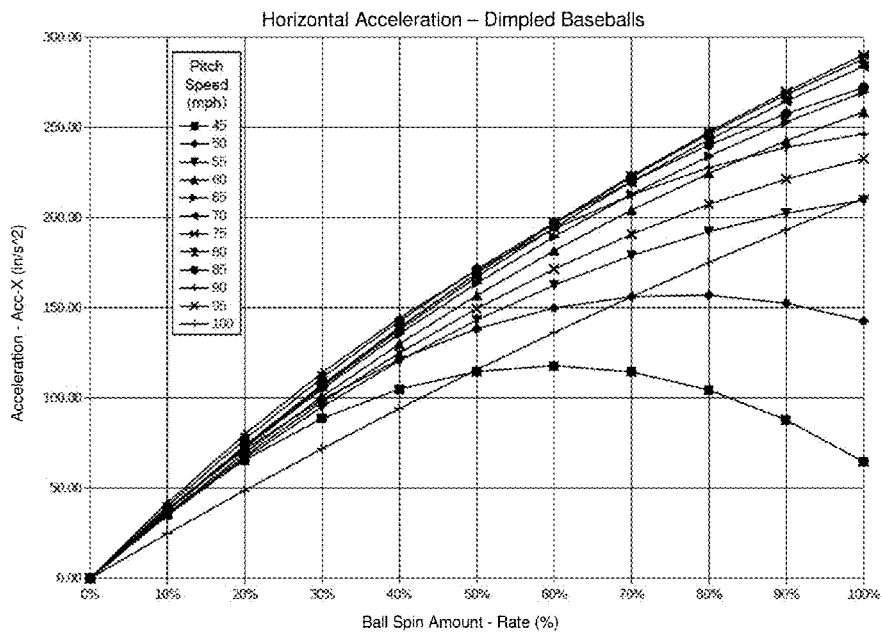
FIGS. 26A-26D: Graphs of horizontal and vertical acceleration data for dimpled and laced balls.
Figure 26B:
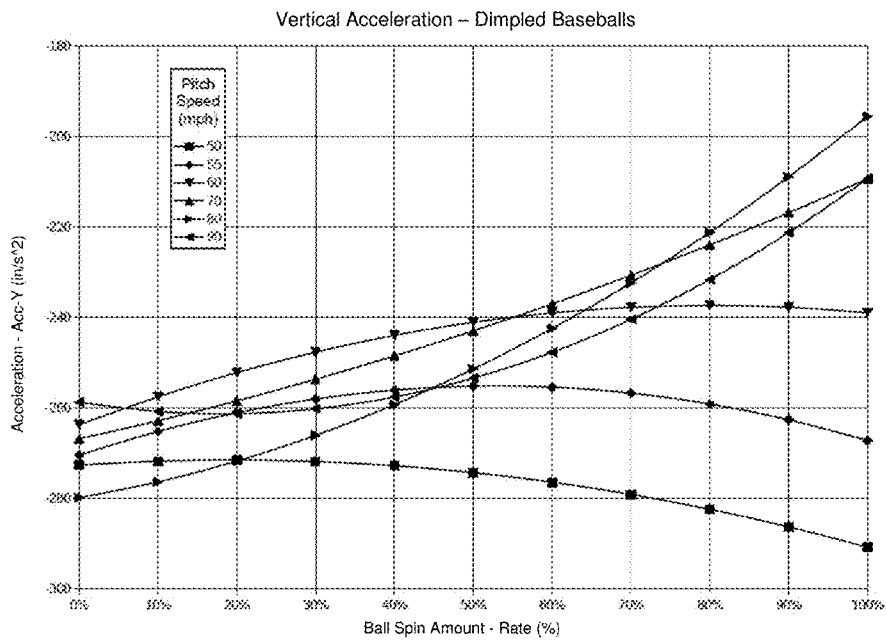
Figure 26C:
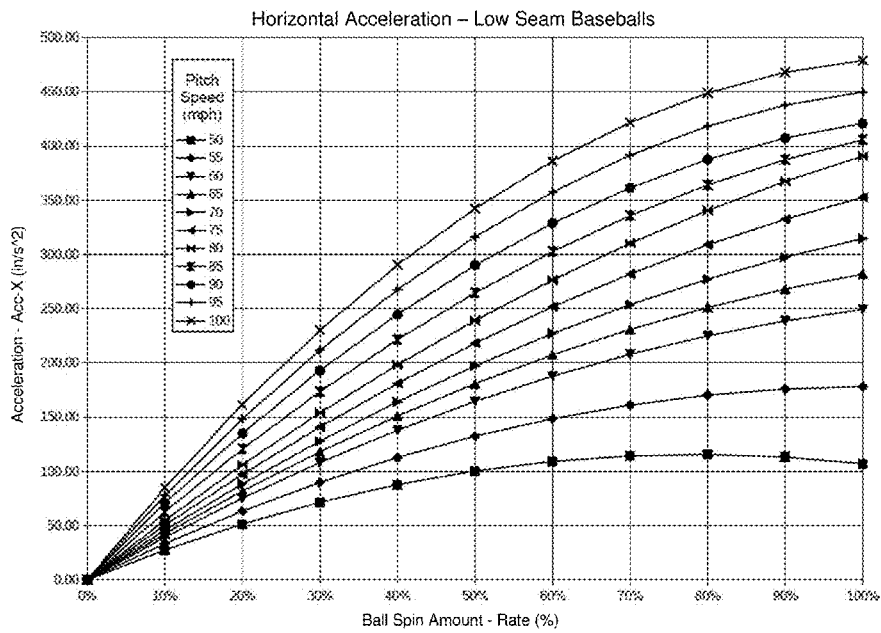
Figure 26D:
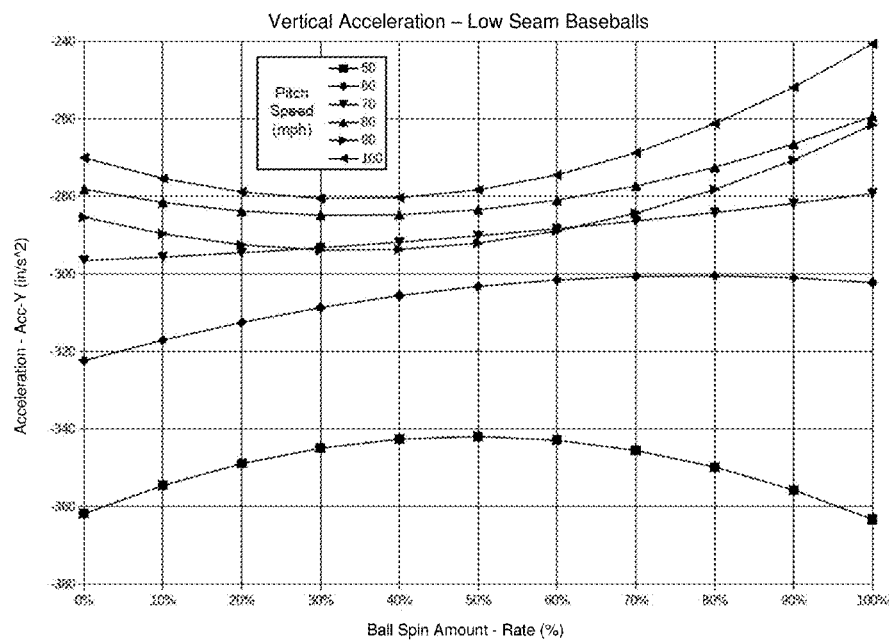

According to one method particularly explained in detail below and shown in the graphs of FIGS. 26A-26D, sets of horizontal acceleration equations and vertical acceleration equations for different pitch speeds have been empirically developed for varying spin rates for two (2) different types of balls, a dimpled baseball (FIGS. 26A and 26B) and a low seam laced baseball (FIGS. 26C and 26D). Persons of ordinary skill in the art will appreciate that the original equations for horizontal acceleration (acc-x) and vertical acceleration (acc-y) could continue to be used to match the same empirical data by the use of the variable (CLift$_{eff}$) or the baseline CLift (CLift$_{bl}$) for each type of ball and the variable correction factor (F$_{Corr}$), wherein these variables change according to the pitch speed and spin amount.

While prior art pitching machines have also used empirically determined data for aiming, the variables stored for aiming the machines and the overall methods used in the prior art systems are extremely limited because they are based on empirically developed tables of hardware parameters, such as wheel speeds and horizontal and vertical angles of the machine, which represent individual pitches that could be selected but would not allow for calculating the aim based on the acceleration of the balls according to the pitch speed and spin rate set without having to select a particular type of pitch. Since the tables of the prior art machines are based on wheel speeds and the orientation of the machine, new pitches could not be defined without performing additional trial and error tests and then creating new table entries for the newly defined pitches. Additionally, these prior art tables would be inaccurate if the distance to the target point changed from the set distance used when the tables were produced. Accordingly, there remains a need to have aiming equations that use calculated acceleration values of the balls which can be used to automatically aim any pitch according to its speed and spin rate at any given distance rather than tables of hardware parameters that only work for a given set of predefined pitches at a particular set distance. Put another way, there is a need for automated aiming that is calculated using acceleration data for an unlimited number of different pitches, possibly at different distances, rather than manually determining the aiming for a set number of pitches at a set distance and storing the aiming data according to specific hardware parameters of the pitching machine which does not allow for aiming to be determined according to variations in pitch speed and spin rate as well as possible variations in distance.

According to one version of the present invention's aiming calculations, the computer processor performs automatic aiming determinations using acceleration equations with pitch speed and spin rate as inputs to calculate the accelerations, and spin direction is used in breaking the accelerations into horizontal and vertical components. According to the equations provided above, the standard calculation for Magnus acceleration and the assumption of constant gravitational acceleration can be used. Alternatively, two (2) sets of empirically determined quadratic equations can be used to determine the accelerations for a given pitch speed and spin rate. The first set of equations is used to determine the "net gravitational" acceleration and combines the effects of gravity, drag, and machine recoil. Magnus acceleration is broken into horizontal and vertical components based on the spin direction, while the second "net gravitational" acceleration of the pitched ball is always vertical. Accordingly, the difference between this inventive method and other embodiments that assume constant gravitational acceleration and apply standard Magnus calculations vary in how horizontal and vertical acceleration are determined.

In determining the Magnus acceleration and net gravitational equations, a three-wheeled pitching machine was used to throw pitches at a wall 54 feet away and the ball's impact point were recorded. A grid was drawn on the wall to aid in determining the impact location of each pitch. For convenience, separate tests were run for determining horizontal and vertical acceleration. This allowed the observer to record a single value for each pitch, rather than two. Multiple balls for each pitch setup were thrown, and the average impact location was recorded.

The machine was set to throw pitches between 45 and 100 mph and ball spin was set to a horizontal direction to isolate Magnus acceleration from drag and gravitational effects. The ball spin rate ranged from 0 to 3000 RPM. For convenience, ball RPM was recorded as a percentage of the top rate. Whenever the impact location was more than 12 inches from the original aim point, that is the ball was curving or dropping more than 12 inches, the machine's aim was adjusted by 12 inches, and this value was added back into the observed impact location. This was done both for convenience and to keep the flight path a consistent length. Additionally, the tests were run using dimpled plastic baseballs and low seam standard laced baseballs.

In the preferred embodiment equations were developed using two popular ball types, namely laced and dimpled baseballs. Ball type and condition affect pitch trajectory. To accommodate additional types of balls, such as softballs or lightweight foam practice balls, new equations can be developed using the same procedures described herein. A less accurate but easier method is to apply a user defined "correction factor" to the calculated value for acceleration. For example, if the standard calculated value for Magnus acceleration of a certain pitch is 200 in/s$^2$ and the user selects a correction factor of 0.8, a value of 200*0.8=160 in/s$^2$ is used for that pitch. This correction factor, defined by the user at time of machine use, can also correct for variations in atmospheric conditions that affect pitch trajectory.

Horizontal acceleration was calculated from horizontal impact location per the classic physics formula as provided below, with t being the time of flight, t=distance/velocity.

$$x = x_0 + v_0 t + 0.5 a t^2$$

$$\text{or } a = 2*(x-x_0)/t^2$$

Additionally, vertical acceleration was measured using the same method except that the vertical impact location was recorded instead of horizontal.

The results for horizontal acceleration for dimpled baseballs and laced baseballs are shown below in Table I-A and Table I-B, respectively.

TABLE I-A

Horizontal acceleration, plastic dimpled baseballs

| Pitch Speed (mph) | C1 | C2 | C3 |
| --- | --- | --- | --- |
| 50 | −268.2 | 410.9 | 0 |
| 55 | −153.4 | 363.1 | 0 |
| 60 | −110.5 | 369.1 | 0 |
| 65 | −115.4 | 385.0 | 0 |
| 70 | −100.7 | 384.6 | 0 |
| 75 | −95.4 | 385.7 | 0 |
| 80 | −99.9 | 388.0 | 0 |
| 85 | −141.0 | 413.2 | 0 |
| 90 | −191.0 | 437.5 | 0 |
| 95 | −132.9 | 365.6 | 0 |
| 100 | −41.2 | 251.9 | 0 |

TABLE I-B

Horizontal acceleration, low seam laced baseballs

| Pitch Speed (mph) | C1 | C2 | C3 |
| --- | --- | --- | --- |
| 50 | −187.7 | 410.9 | 0 |
| 55 | −173.5 | 363.1 | 0 |

TABLE I-B-continued

Horizontal acceleration, low seam laced baseballs

| Pitch Speed (mph) | C1 | C2 | C3 |
|---|---|---|---|
| 60 | −159.3 | 369.1 | 0 |
| 65 | −159.5 | 385.0 | 0 |
| 70 | −159.7 | 384.6 | 0 |
| 75 | −167.3 | 385.7 | 0 |
| 80 | −174.9 | 388.0 | 0 |
| 85 | −246.7 | 413.2 | 0 |
| 90 | −318.4 | 437.5 | 0 |
| 95 | −365.3 | 365.6 | 0 |
| 100 | −412.2 | 251.9 | 0 |

The results for vertical acceleration for dimpled baseballs and laced baseballs are shown below in Table II-A and Table II-B, respectively.

TABLE II-A

Vertical acceleration, plastic dimpled baseballs

| Pitch Speed (mph) | C1 | C2 | C3 |
|---|---|---|---|
| 50 | −29.61 | 11.46 | −272.6 |
| 55 | −54.49 | 57.72 | −270.4 |
| 60 | −41.13 | 65.9 | −263.7 |
| 65 | −10.89 | 52.01 | −265.3 |
| 70 | 19.36 | 38.12 | −266.8 |
| 75 | 37.06 | 33.82 | −273.3 |
| 80 | 54.75 | 29.52 | −279.8 |
| 85 | 66.15 | 0.70 | −269.3 |
| 90 | 77.54 | −28.12 | −258.7 |
| 95 | 87.54 | −38.12 | −248.7 |
| 100 | 97.54 | −48.12 | −238.7 |

TABLE II-B

Vertical acceleration, low seam laced baseballs

| Pitch Speed (mph) | C1 | C2 | C3 |
|---|---|---|---|
| 50 | −82.68 | 81.21 | −361.8 |
| 55 | −59.53 | 68.85 | −342.1 |
| 60 | −36.38 | 56.49 | −322.3 |
| 65 | −13.69 | 32.39 | −309.4 |
| 70 | 9.00 | 8.28 | −296.5 |
| 75 | 33.90 | −15.85 | −287.3 |
| 80 | 58.79 | −39.98 | −278.1 |
| 85 | 66.60 | −45.29 | −281.7 |
| 90 | 74.41 | −50.60 | −285.3 |
| 95 | 83.14 | −56.54 | −277.7 |
| 100 | 91.87 | −62.47 | −270.0 |

This data was then graphed, as shown in FIGS. 26A-26D, for each tested pitch speed using ball spin rate as the independent variable. Quadratic best fit curves were calculated for each tested pitch speed. The equations defining these curves provide the desired acceleration value given a pitch speed and spin rate and linear interpolation was used for pitch speeds between those tested. Based on the fit lines, the following equation resulted which is used in the improved aiming function where spinamount is the ball spin magnitude expressed as a percentage of the top spin rate of 3000 RPM.

$$acceleration = C1*spinamount^2 + C2*spinamount + C3$$

For example, for a dimpled ball, the table corresponding to the type of ball (Table I-A) is selected, and at 50 mph, the variables for C1 (−268.2), C2 (410.9), and C3 are obtained from the table, and with a 60% ball spin, the variables are entered into the quadratic equation as shown below, and the horizontal acceleration is calculated to be 150.0 in/s^2.

$$horizontal\ acceleration = -268.2 \times (0.60)^2 + 410.9*(0.60) + 0 = 150.0\ in/s^2$$

Given a particular pitch speed and ball spin rate, Magnus acceleration is found in Table I and broken into horizontal and vertical components based on the spin direction. Given the same pitch speed and ball spin rate, net gravitational acceleration is found in Table II and added to the vertical component of the Magnus acceleration to give actual vertical acceleration. Of course, different tables can be derived and used based on ball type and condition. Accordingly, the aiming function uses the resulting equations from the data collected in Tables I and II and to calculate the ball's horizontal and vertical acceleration and the resultant trajectory and in effect automatically aim the pitched ball based on the given parameters.

According to the innovative features of the invention as described above, there is an innovative interface for a ball pitching machine which accepts calculations provided above the required aim-point based on the inputs, and adjust the various electromechanical systems to deliver the game ball to an input desired target location Existing "smart" pitching machines use integrated microcontrollers, microprocessors, or computers to control the machine. The software used to provide the user interface, define pitches and pitchers or defensive drills, and any aiming involved runs on hardware that is a part of the machine. This software cannot easily be updated by a casual end user or ported to another type of machine.

According to the present invention, the system disclosed herein divides the control system into two (2) pieces with one piece being a low level machine hardware specific control system running on the machine and the other piece being a high level user interface system 80 preferably running on a smartphone, a tablet computer, a computerized controller interface that may be part of a pitching machine, or any similar controlling device 82. This two (2) level control system places the intelligence of the system in the software running on the high level device, while the machine contains the software required to control the hardware specific to that particular machine. In other words, the high level user interface determines what pitch to throw, and the lower level machine system determines how to throw it.

This approach has several advantages. It allows the user interface display to be easily upgraded or updated by a user through common app store or web distribution methods, so that a machine can be updated by its owner with new functionality and improved interfaces for years after its original manufacture. Further, it provides a common standard for independent machine and interface development so that machine manufacturers and software developers can work separately, allowing a variety of interfaces from a number of developers to control any pitching machine that meets the standard, regardless of manufacturer or configuration (1, 2, or 3 wheels, arm, air cannon, etc). Users would be free to use their favorite interface on any standardized machine, regardless of manufacturer.

Communication between the two systems can be wired or wireless 78. In one embodiment, the machine provides a Wi-Fi access point so that any Wi-Fi enabled device can be used as a control interface. Further, alternative embodiments may integrate the high-level system with the low-level system into a single interface. In the case of the computerized controller interface that is a part of the pitching machine, the communication module for the controller interface can have a Wi-Fi connection to easily download different interface software programs into the memory to be run by the computer, thereby allowing for a configurable interface even when the hardware stays the same. Accordingly, the selection of software for a given pitching machine would preferably be based on the control capabilities of the machine.

In operation the method of controlling different computer-controlled pitching machines based on corresponding sets of control parameters includes:

Selecting a pitching machine to be used which may include a wheeled machine, arm throwing machine, cannon or other machine type.

Connecting the pitching machine, wired or wirelessly, to a controller interface which includes a display screen, user-entry port, memory, computer processor, and communication module.

Sending a pitching machine dataset or dataset identifier from the pitching machine to the controller through the communication module.

Processing the dataset in the controller and determining a machine capability based thereon wherein the machine capability will directly depend on the selected pitching machine.

Showing on the display screen a set of pitch options that correspond with the particular machines capabilities.

Receiving a selected pitch dataset from the user through the user-entry port that corresponds with the set of pitch options shown on the display screen.

Determining a set of control parameters for the selected pitch.

Sending the control parameters for the selected pitch from the controller to the machine through the communications module.

The method allows control of different computer-controlled pitching machines 100 that may have different pitching capabilities based on various control parameters that operate based on various control signals having associated values. In operation, the pitching machine is selected and connected to a controller interface having a display screen 84a, user entry-port 84b, memory 84c, and a communication module 84d. Once the connection has been established, the low-level machine system sends a dataset corresponding to a series of values which are received and processed within the controller through the communications module. Based on the received dataset, the controller determines the capability of the machine which will vary by type of machine. For example, relevant dataset machine parameters that are sent from the machine to the controller are included in Table III-A below.

TABLE III-A

Machine Throw Parameters sent to Controller

| PARAMETER | EXAMPLE VALUES | DESCRIPTION |
| --- | --- | --- |
| machine type | arm, two wheel, cannon | basic configuration of machine |
| speed range | 0 to 100 mph, 30 to 90 mph | fastest and slowest speeds the machine can throw a ball |
| ball spin rate range | 0 to 0 RPM, 0 to 3000 RPM | fastest and slowest speeds the machine can spin a ball |
| ball spin angle φ range | 0 to 0°, 90 to 90°, 0 to 360° | range of angles the machine can orient the ball's spin axis perpendicular to direction of travel. "0 to 0" = horizontal only, "90 to 90" = vertical only |

TABLE III-A-continued

Machine Throw Parameters sent to Controller

| PARAMETER | EXAMPLE VALUES | DESCRIPTION |
| --- | --- | --- |
| ball spin angle θ range | 0 to 90°, 90 to 90° | range of angles the machine can orient the ball's spin axis from direction of travel |
| ball types | baseball, softball, tennis ball | types of balls the machine can throw |
| horizontal range | 0 to 0°, −90 to 90° | how far from center the machine can adjust its horizontal aim |
| vertical range | 0 to 0°, −15 to 90° | how far from center the machine can adjust its vertical aim |

Although any combination of the various parameters listed herein or other parameters may be included in the dataset sent from the machine to the controller, the values preferably include top pitch speed, how much the orientation of the ball's spin axis can be controlled, top ball spin rate, and its horizontal and vertical aiming angle range. The machine's capabilities are then incorporated into the controller interface and a display format is determined to be shown in the display. For example, if the machine being controlled is an air cannon that cannot control ball spin but can change its aim, the ball spin options would be removed from the display, but the aiming options would remain. As an alternative, the interface would keep the ball spin options available on the display to the user and attempt to compensate using the available hardware options, i.e., change the aim to throw the non-spinning ball to the same location where a spinning ball would have gone.

Figure 28:
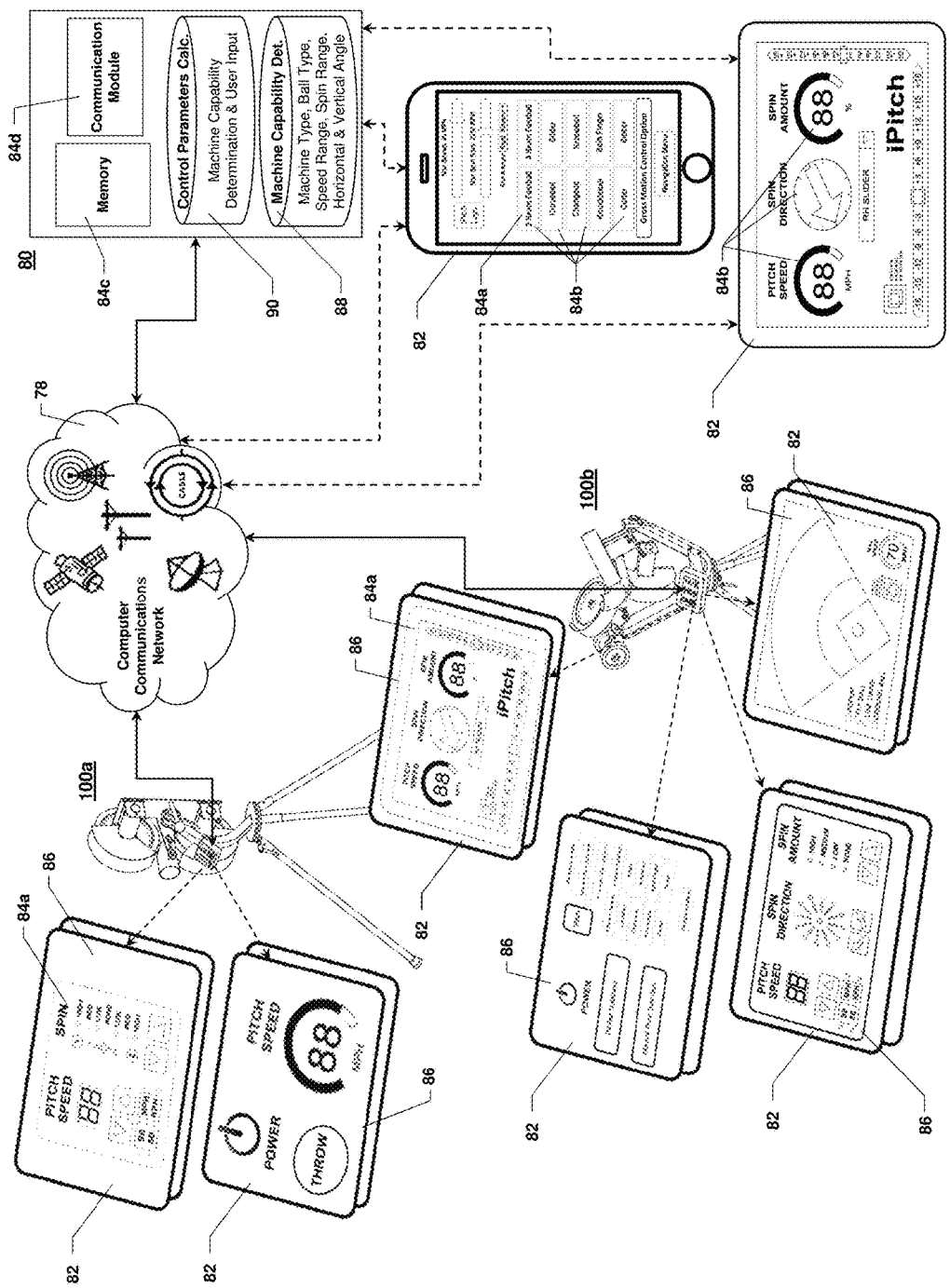
FIG. 28: Schematic diagram of universal control system architecture.

As explained above, the dataset consists of one or more of the predefined listed values which include a pitching machine type, a speed range, a spin rate range, a spin angle range, a ball type, a horizontal range, a vertical range, and any combination thereof. These range of values, individually or in combination, are converted into machine controls which ultimately are used to throw the pitch and therefore collectively correspond with multiple predefined pitching machine parameters. These predefined parameters are stored in a database and are used to define the pitching machine capabilities, as described above. Accordingly, after the dataset is received by the controller, the controller only returns pitch selection options and corresponding pitching machine control parameters associated with the particular machine. Thus, a user using a machine that cannot impart spin on the ball does not erroneously see spin angle as a selectable pitch parameter and no spin control is sent from the controller to the machine. As shown in FIG. 28, the control parameters are calculated based on the machine capability and the user input.

Alternatively, the machine may send a single dataset identifier, such as a machine ID including the make, model number and series, or the media access control (MAC) ID which includes a hardware address and capabilities, or other unique identifiers. Subsequently, the controller may access a database containing relevant parameters associated with the dataset identifier. Thus, the computer-controlled machine does not necessarily store machine data but instead relays a single machine identifier which correlates to the plurality of machine parameters associated therewith stored on a remote database. This database may be stored locally or remotely on the controller or may be accessed via the internet or uploaded directly to the high level system.

Once the dataset is processed and the machine capability is determined 88, the controller relays a set of display formats 86 showing various pitch options corresponding with the determined machine capability to the display screen. Additionally, users can navigate between various available formats through a navigation menu 102 or enter other user-entry ports, such as the gross motion control option 104. As shown in FIG. 28, the various pitch options are shown on the display screen which may include a user-entry port that the user can interact with in order to select a pitch. Although the display may be separate from the user-entry port, an integrated touchscreen preferably provides both the display and user-entry port.

Subsequently, a pitch is selected by the user through the entry-port and the series of control parameters 90 that define the desired pitch are passed from the controller to the machine. As shown in Table III-B below, control parameters can include various inputs.

TABLE III-B

Pitch Parameters Sent to Machine

| PARAMETER | EXAMPLE VALUES | DESCRIPTION |
| --- | --- | --- |
| ball type | BB, SB | type of ball to be thrown |
| pitch speed | 60 MPH, 90 MPH | speed of the pitch |
| spin angle $\phi$ | 0°, 214° | ball spin axis angle perpendicular to flight path |
| spin angle $\theta$ | 0°, 22.5°, 90° | ball spin axis angle parallel to flight path |
| spin rate | 0 RPM, 1800 RPM | how fast the ball spins |
| horizontal angle | 0°, −12°, 0.25° | horizontal aiming angle |
| vertical angle | 0°, −12°, 0.25° | vertical aiming angle |
| time to adjust | 1 second, 10 seconds | how long the machine should take to adjust to the new settings |

The machine takes these parameters and converts them to the hardware specific values needed and sets up to throw that pitch. Generally, the most common machines will receive a pitch speed, spin rate and spin direction as the control parameters, and as explained below, various entry types can be integrated with the universal pitcher system. For example, gross motion entries may be used or a specific pitch associated with a particular pitcher may be selected by the user from a pitcher database. Other machines and controller systems may include multiple display options based on multiple controller interface formats that are selectable by the user. For example, one display may include a manual pitch speed indicator, spin rate indicator, and spin direction indicator whereas another selectable format may list a set of pitches by name in a dropdown menu.

As explained in greater detail below, when a gross motion detection system is used as the user-entry port with one of an orientation sensor and a touchscreen being integrated with or in communication with the controller, gross movement input corresponds to a pitch selection and a gross input database correlates the pitch with the corresponding sets of control parameters. Accordingly, the controller determines the gross movement input and retrieves the corresponding control parameters from the database which are sent and processed by the machine in turn.

In the case where a set of pitchers or pitches is selected, such as with gross motion, a drop down menu or unique buttons shown at location specific zones on the display screen rather than a manual entry of individual pitch parameters, the system links to a pitcher database saved in the memory having a set of pitcher throw style descriptions that correspond to an arm side and multiple arm angles. Once a pitcher is selected, a set of pitches is provided each having a correlating set of control parameters that include pitch speed, spin rate, spin angle relative to the direction of ball travel and a set of spin orientation equations for the particular pitch and throw style. Accordingly, the control parameters, including orientation angle, are automatically calculated based on the selected pitch and corresponding pitcher.

As an example, a user may choose a specific pitcher's fastball from a graphic user interface ("GUI") running on the controlling device. In one example, the application determines a series of five values [90, 45, 1200, −4.5, 12.1] which define the pitch, and sends them to the machine. This data can be interpreted as a 90 mph pitch with a spin angle of 45° and spin rate of 1200 rpm aimed 4.5° left of center and 12.1° above horizontal. Alternatively, another controller may determine a series of eight values [BB, 90, 60, 90, 2000, −4.5, 12.1, 7.5] which define the pitch that is sent to the machine. This data can be interpreted as a 90 mph baseball pitch with a spin angle ($\phi$) of 60°, a spin angle ($\theta$) of 90°, and a spin rate of 2000 RPM aimed 4.5° left of center and 12.1° above horizontal. The machine should take 7.5 seconds to reach these new settings although this time may vary from machine to machine. The machine then calculates the required hardware specific values needed to throw this pitch and sets up to throw it.

The hardware specific values to be calculated based on the control parameters depends on machine configuration. A two wheel machine, for example, will need to calculate two wheel speeds and the roll angle of the plane of those two wheels, while a three wheel machine would need to calculate three wheel speeds and no roll angle. While the pitch and yaw angles define the aim of the machine directly and would be calculated by the high level system, the machine would still need to calculate how the hardware would achieve those angles, such as the number of pulses needed to be sent to a stepper motor.

In an incremental encoder type system, the machine would need to also calculate the difference between the current and desired orientation angle, while an absolute encoder system would simply move to the desired angle. The "time to adjust" value can be increased to reduce the load on the machine when a fast adjustment is not necessary or to hide the machine's adjustment from the batter for greater game-type realism. In an open loop aiming system, the machine would need to also calculate the difference between its current and desired orientation angle, while a closed loop system would simply move to the desired angle. Alternative methods for calculating wheel speeds and aiming have been covered in prior art and can be incorporated into the invention described herein, including the alternative methods described above.

Other hardware specific parameters may include air pressure for pneumatic systems or displacement for a spring powered system. In each case, the high level control defines the pitch to be thrown, and the low level system calculates how to do it, given its specific hardware configuration. Further, if the machine requires manual loading of the ball to be pitched, the machine may send a "ready" message back to the high level controller to indicate to the operator that the machine has processed the control parameters and completed its setup for the new pitch and a ball may be loaded. If the machine is equipped with an automatic ball feeder, this ready signal could also initiate a ball being loaded.

This system may be expanded at any time by adding to the list of values sent by the high level controller. For example, the speed at which the machine changes aim can be appended to the original example list of five parameters. Older machines built before these additional parameters were introduced to the system would ignore the extra parameters while newer machines would use them. Pitch is used here as a generic term for any launched ball, whether it used for defensive drills or for batting practice.

Further, although the preferred system provides the user interface on the machine itself through a wired connection, it will be appreciated that the controller interface can be provided on a mobile computing device having a touchscreen. For example, a mobile device, such as a phone, is preferred when the display format is a gross movement input system. Similarly, a remote device having a storage module storing a pitcher database is preferably used when the user display shows a predefined pitcher and pitch name. Accordingly, the controller may have a wireless communication module as well as a hardwired communication with the computer-controlled pitching machine.

As apparent from the user interfaces shown and described in the present application as well as those disclosed in U.S. Pat. No. 7,082,938 and US Pat. App. No. 2002/0185120, different control selectors and different arrangements of these selectors have been created for the user interface with various makes, models, and series of ball throwing machines, with control selectors including but not limited to hardwired interfaces that may have buttons, dials, knobs, switches, and/or other physical devices and computerized graphical user interfaces (GUI) that may simulate any one or more of these physical selectors or may have entirely different control selectors. In comparison to the known computerized GUIs, the controller interface of the present invention can be designed to emulate the interfaces of any one or more makes, models, and series of smart pitching machines according to the particular capabilities of the machines as communicated to the controller interface. Accordingly, the look, function and operation of the user interfaces described in the '938 Patent and the '120 Application are incorporated by reference herein and may be emulated by the controller interface of the present invention.

In another aspect of the pitching machine described herein, the parameters used by the pitching machine have been expanded wherein the ball's axis of rotation can now be fully controlled in three dimensions in some machine embodiments, along with ball speed and spin amount (also called spin rate). The original three (3) parameter pitch definition method described above with the non-dimensional speed, non-dimensional spin amount, and the direction based on the angle of the Magnus acceleration assumes that the ball's axis of rotation was perpendicular to the ball's direction of travel which is well suited for machines that can only throw pitches of this type. With new developments in various pitching machine hardware, the spin axis can be varied in any orientation. Accordingly, in addition to the speed and the spin amount, two (2) spin angles can be used to define the spin on the ball. The present invention allows for the addition of a fourth value which defines the angle of the ball's spin axis relative to the ball's direction of travel and can be viewed from different frames of reference, i.e., pitcher, catcher, or possibly some other reference point, and different coordinate systems, i.e., Cartesian X-Y-Z plus the original direction, azimuth and elevation, or some other coordinate system.

Figure 31B:
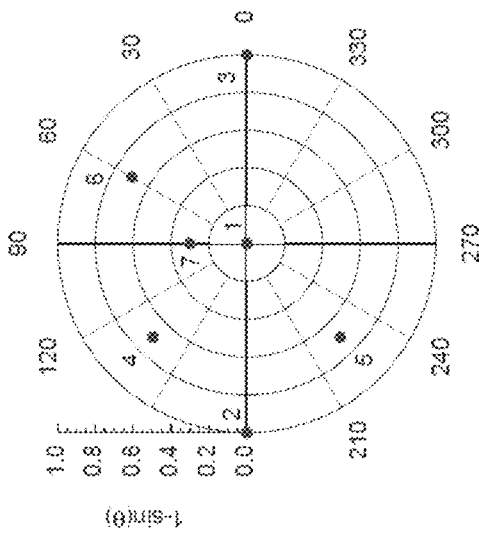
FIGS. 31A, 31B, and 31C: Visual representation of spin angle, spin axis and arm angle.
Figure 31C:
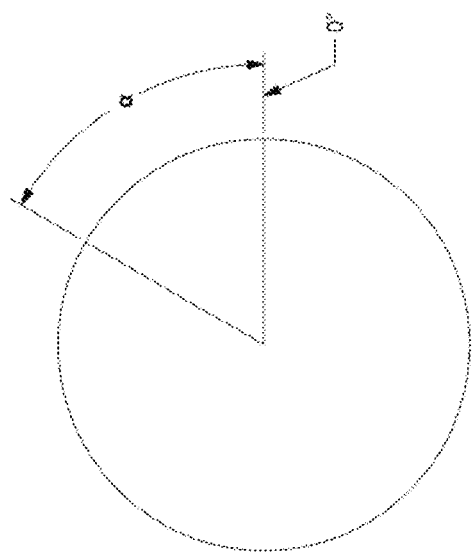
Figure 31A:
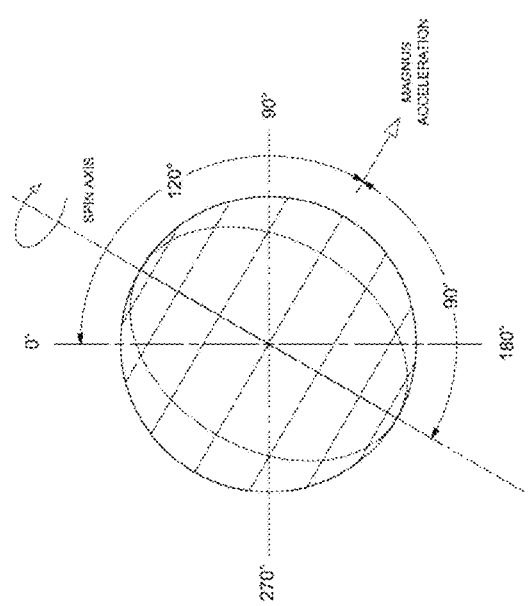

With the addition of the new pitch parameter for machines that can vary the orientation of the spin axis, plus the addition of arm angle (a) into the calculations, it is convenient to redefine the original coordinate system for spin angle with a more traditional coordinate system as described by Dr. Alan Nathan in his 2011 paper "Determining the 3D Spin Axis from TrackMan Data." In the original coordinate system, shown in FIG. 31A, spin angle is defined as the direction of Magnus acceleration as seen from the pitcher's point of view, with the ball's spin axis perpendicular to the Magnus acceleration. In the original system, zero degrees is up, and the angles are positive in the clockwise direction. In comparison, FIG. 31B illustrates the more traditional coordinate system where the spin axis is particularly defined instead of the direction of Magnus acceleration. The spin axis is defined using two angles as seen from the catcher's point of view: one spin angle ($\phi$) is measured in a plane perpendicular to the ball's direction of travel, and the other spin angle ($\theta$) is measured between the spin axis and the ball's direction of travel. In the equations presented above for the original system, spin angle ($\theta$) was always 90° and therefore could be ignored. Additionally, arm angle ($\alpha$) is defined in FIG. 31C. It will be appreciated by those skilled in the art that the particular coordinate system or point of reference used to control the pitching machine is a matter of convenience, and values from one system may be converted to another system.

Pitches defined with the original three (3) parameters can be used on four (4) parameter systems by assuming 90° or perpendicular value for the additional angle whenever only three parameters are present. Three parameter machines can approximate four parameter pitch definitions by ignoring the fourth value. The benefit of the two (2) level control system of the present invention is that whatever coordinate system or frame of reference is selected for the controller interface, the software can provide the appropriate conversions based on the particular capabilities of the machine being controlled, and the control signals for the machine can be determined accordingly. As explained above, the intelligence of the system is in the software running on the high level device while the pitching machine contains the software required to control the hardware specific to that particular machine.

Figure 29:
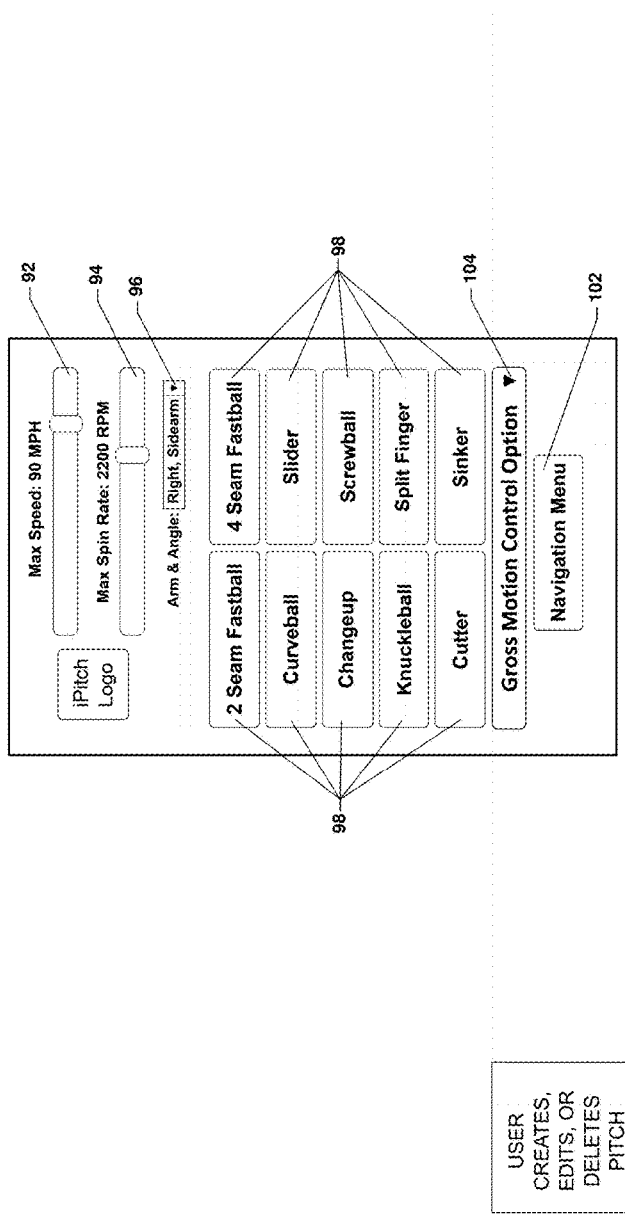
FIG. 29: Front view of iPitcher graphic user interface.

In another aspect of the pitching machine and system described herein, the iPitcher interface depicted in FIG. 29 provides a fast and simple method for defining a realistic pitcher for use on a smart pitching machine using just three pitcher parameters. Namely, these pitcher parameters are a maximum pitch speed 92, maximum ball spin rate 94, and pitcher throw style 96 which correlates with the throwing hand and arm angle.

Prior art smart pitching machines have the capability to define specific pitches and to break those pitches into groups representing the pitches thrown by a specific pitcher, real or fictional. Defining these pitches is typically accomplished by trial and error, with the machine's settings, for example wheel speeds and machine aim, being recorded for future retrieval once a desired pitch has been found. While this process is cumbersome and time consuming for a skilled machine manufacturer, it is even more so for a casual machine user and often times impractical for casual user to perform on their own. Improved machines described in the prior art have integrated a three pitch parameter system for defining any pitch thrown by a pitching machine, namely, speed, spin angle, and spin amount. Machine aim is calculated based on the projected trajectory of a pitch with these pitch parameters. While this system works well, it still requires each pitch to be defined individually.

In another aspect of the machine and system described herein, a new method is provided which expands on previous systems by quickly defining pitchers, not just individual pitches. More specifically, it defines a set of related pitches that represent a set of pitches that a real pitcher would throw. Preferably, the set of pitches corresponding with a particular pitcher includes ten pitches, but it will be appreciated that the number of pitches in the set may vary. In the preferred embodiment having ten pitches in a set, the three pitcher parameters define thirty pitch parameters at once: the three pitch parameters of ten different pitches, which individually correlate to a unique set of throwing machine parameters to achieve the pitch. The method is generally as follows:

- Providing a controller interface, as described above, that is an operative communication with a selected pitching machine.
- Providing a pitch database saved within the controller memory having a set of pitch names that are correlated with non-dimensional control parameters (i.e. pitch speed percentage and spin rate percentage) and a spin direction. In operation, the non-dimensional control parameters corresponding to each pitch is percentage of a maximum pitch speed and maximum spin rate for a particular pitcher. Further, the spin direction is relative to the direction of travel.
- Receiving a selected pitch, a desired maximum pitch speed, and a desired maximum spin rate by way of a user entry in the user-entry port.
- Retrieving the non-dimensional control parameters from the database that correspond to the selected pitch which define the pitch speed percentage, spin rate percentage and the corresponding pitch spin direction.
- Calculating a pitch speed control based on the retrieved pitch speed percentage and the desired maximum pitch speed entered by the user.
- Calculating a spin rate control based on the retrieved spin rate percentage and the desired maximum spin rate entered by the user.
- Calculating a spin direction control amount according to the pitch spin direction.

Each of the pitch parameters of the available pitches 98 is defined using three pitcher parameters, as discussed below. The new parameters may be set by using a GUI having sliders, numerical entries, dropdown menus, or other widgets, analog dials, switches, or a variety of other methods. The pitcher parameters may be continuous or set in discrete increments. Once these three parameters are set, the pitches are automatically defined and immediately available for use on the machine. Although the general method introduced above refers to a single pitch, it will be understood that a series of pitch names may be set with a desired maximum pitch speed and spin rate which are subsequently used to retrieve a series of pitches from the database and calculate a series of speed, spin and direction control amounts for the series of pitches. Similarly, the steps of receiving the pitch name, retrieving the relevant parameters for the selected pitch and calculating the control amounts can be repeated for any number of pitches within the set of pitches.

The first parameter that is entered by the user through the user-entry port is the maximum pitch speed which correlates to the speed of the fastest pitch the pitcher can throw. All individual pitch speeds are dependent upon the top speed parameter. In the example GUI shown in FIG. 29, the maximum speed is set with a slider and the pitch speed of all other pitches are defined as a percentage of the maximum. For example, Table V-A shows the default speed percentages for the ten preferred pitches. However, it will be appreciated that these percentages are merely exemplary and they may be reset by the user as desired.

The second parameter that is entered by the user through the user-entry port is the maximum spin rate of a thrown ball which is directly related to how much a pitch will curve during flight, and can serve as an approximation of a pitcher's skill level. Spin rate can be directly expressed in RPM or as a percentage of a preset maximum, for example 3000 RPM. The ball spin rates of most pitches and pitchers are not widely known by casual pitching machine users, so using the percentage method provides users an easy way to select a pitcher's skill level without actually quantifying the ball spin rate in RPM. They can simply use 50% to choose an average spin rate or a higher value for greater spin rate and subsequently greater break. Advanced users may know the actual spin rate of pitchers they are simulating, and they can choose the spin rate directly in RPM. The interface may switch between the two methods based on user preference. Preferably, the user selected spin rate is set above a certain minimum, for example 300 RPM, because low spin rates result in knuckleballs, which move randomly, no matter the direction of spin. Accordingly, the spin rate parameter is used directly in all pitches except for knuckleballs and split finger pitches, which preferably have no spin.

The third parameter that is entered by the user through the user-entry port is the pitcher throw style and correlates with the arm angle which consists of both the throwing arm (left or right) and the angle of the throwing arm. This parameter affects the angle of spin ($\phi$) and therefore break, for all pitches except for sinkers, which have topspin, and knuckleballs and split fingered pitches, which have no spin.

Although the spin direction is relative to the selected pitch, the throw style similarly affects spin wherein a left handed pitcher imparts a different spin than a right handed pitcher, even when both are throwing the same pitch type. Accordingly, another aspect of the method described may also include the following steps in addition to the steps described above:

- Providing a pitcher database in the memory of the controller having a set of throw style descriptions with respective arm angles and arm sides correlated to each pitcher.
- Showing the set of pitcher throw styles on the display screen for user selection.
- Receiving through the user-entry port a desired throw style selected by the user.
- Retrieving the desired arm angle associated with the throw style from the pitcher database.

Further, the pitch database comprising the pitch names may also include sets of spin orientation equations corresponding to various pitcher throw style descriptions. These pitcher throw styles have a throwing hand and style, for example a sidearm style or overhand style, and the spin orientation equations depend on the throwing hand and style for each pitch. As with the non-dimensional parameters discussed above, the throw style and associated spin orientation equation is retrieved from the pitch database that corresponds with the selected pitch and pitcher. Subsequently, the orientation angle is calculated using the arm angle from the pitcher database and the spin orientation equation for the pitch database with the orientation angle defining the spin axis of the ball perpendicular to the direction of travel.

In the example GUI of FIG. 29, throw style is selected from a dropdown menu of values, as shown in Table IV below, or the user may set the arm angle ($\alpha$) value directly, if known.

TABLE IV

Arm Angle (α) of Common Baseball Pitchers

| Pitcher Description | α |
| --- | --- |
| left handed, sidearm | 180° |
| left handed, ¾ | 150° |
| left handed, overhand | 120° |
| vertical only | 90° |
| right handed, overhand | 60° |
| right handed, ¾ | 30° |
| right handed, sidearm | 0° |

Vertical arm angle is a special case of arm angle in which all pitches curve in a vertical plane, with either pure topspin, pure backspin, or no spin at all. This setting is particularly well suited for a machine capable of throwing only pitches with these types of spin, such as a two wheel machine with the wheels locked in a vertical orientation. It can also be used for maximum safety, since a vertically breaking pitch will never be thrown directly at a hitter, while a horizontally breaking pitch will.

Once the throw style or specific arm angle (α) is selected, the spin angle (φ) pitch parameter is calculated as shown in the table below which illustrates the spin angles for ten pitches. Lastly, the spin angle (θ) is determined by which of the ten pitches is selected and does not vary relative to pitch speed, spin rate or arm angle discussed above. Spin angles are given in degrees counter clockwise from a ray directed rightward as seen from the pitcher's point of view. (In this system, east=0°, north=90°, west=180°, south=270°.)

The default values for the preferred system are shown in Table V below but one of more of these default values may be reset by the user if desired.

TABLE V-A iPitcher Parameters for Various Pitches

| PITCH | PITCH SPEED | SPIN RATE | SPIN ANGLE θ | SPIN ANGLE φ LEFT ARM α = 90 to 270° | SPIN ANGLE φ VERTICAL ONLY, α = 90° | SPIN ANGLE φ RIGHT ARM α = 270 to 90° |
| --- | --- | --- | --- | --- | --- | --- |
| two seam fastball-A | 100% | 90% | 90° | α − 60 | 90 | α − 120 |
| two seam fastball-B | 100% | 90% | 22.5° | α − 90 | 90 | α − 90 |
| four seam fastball | 100% | 80% | 90° | α − 90 | 90 | α − 90 |
| curve | 80% | 100% | 90° | α + 90 | 270 | α + 90 |
| slider-A | 90% | 90% | 90° | α + 120 | 270 | α + 60 |
| slider-B | 90% | 90% | 22.5° | α | 270 | α + 180 |
| changeup | 80% | 80% | 90° | α − 90 | 90 | α − 90 |
| screwball | 80% | 100% | 90° | α | 270 | α + 180 |
| knuckleball | 80% | 0% | 90°* | N/A* | N/A* | N/A* |
| split finger fastball | 90% | 0% | 90°* | N/A* | N/A* | N/A* |
| cut fastball | 100% | 90% | 90° | α + 180 | 90 | α |
| sinker | 80% | 100% | 90° | 270 | 270 | 270 |

*spin angle not used because spin rate is zero

In Table V-A above, sliders and two seam fastballs have two definitions. The 'A' definition is for machines that cannot vary the θ spin angle. The 'B' definition is for machines that can. The 'B' definitions are the true pitches as thrown by people. The 'A' definitions are approximations of those pitches as traditionally thrown by machines which could not fully control the spin axis in three dimensions.

This system has been developed with baseball in mind, but it can be applied to softball, cricket, and possibly other sports. Pitch names and terminology may differ by sport but the methodology remains the same. An example set of softball pitches and their spin angles are shown in the table below. This table simplifies arm angle into three broad categories: left handed, right handed, and vertical only. This simplified approach to arm angle may be used for baseball, and the more advanced approach originally described may be used for softball. No connection between sport and method should be implied.

TABLE V-B

Spin Angle (φ) of Various Softball Pitches

| PITCH | SPIN ANGLE φ LEFT ARM | SPIN ANGLE φ VERTICAL ONLY | SPIN ANGLE φ RIGHT ARM |
| --- | --- | --- | --- |
| riser | 0° | 0° | 0° |
| rising curve | 315° | 0° | 45° |
| rising screwball | 45° | 0° | 315° |
| curveball | 270° | 180° | 90° |
| screwball | 90° | 180° | 270° |
| sinking curve | 225° | 180° | 135° |
| sinking screwball | 135° | 180° | 225° |
| sinker | 180° | 180° | 180° |
| split finger fastball | N/A* | N/A* | N/A* |
| knuckleball | N/A* | N/A* | N/A* |

*Spin angle is undefined (not used) because spin rate is zero.

It will also be appreciated that the improved pitcher defining method discussed above may also be subject to the machine capabilities for a given machine. Accordingly, prior to prompting a maximum pitch speed or a spin rate, the system may incorporate the steps of receiving in the controller a machine dataset or dataset identifier from the machine and determining a top maximum pitch speed and a top maximum spin rate for the machine based on the machine dataset. Thus, as described above, the selectable options available to the user are aligned with the ability of the machine.

A simple method for defining a pitch thrown by a pitching machine is discussed above. However, an improved method defines a pitch by velocity, spin angle as seen from the pitcher's point of view, and spin rate. The method was introduced to allow casual users to easily create and save their own pitches, with the option of grouping the pitches into a library of pitches thrown by a specific pitchers, as well as creating and saving a library of pitchers. Accordingly, casual users can easily create, save and recall custom pitches.

This improved method is now expanded to include a user generated online database comprising pitcher profiles and a corresponding pitch repertoire. This online database allow users to share their creations, both pitches and pitchers, by grouping the individual custom pitches into a repertoire of pitches thrown by a specific pitcher, as well as creating and saving a library of pitchers. Once defined, these pitchers can be uploaded to an online database for use by other users. A central database is created online which saves the pitcher database and the pitch sets for each pitcher. Users may upload their creations or download the content created by others for use on their ball pitching machine. The pitch and pitcher models may be named and associated with real or fictitious pitchers. As an option, the database may be curated to remove duplicates or low quality entries. The curator may also create "official" entries which may be given higher status than user entries.

Pitches are defined and saved as shown in Table VI-A below. Users define the pitches using a GUI or other input device. The pitch parameters may be determined by trial and error or by utilizing published pitch data. Users may also use an automated ball tracking system such as those offered by Rapsodo, Trackman, or Diamond Kinetics to determine pitch parameters.

TABLE VI-A

Pitch Definition for Online Database

| PARAMETER | EXAMPLE VALUES | DESCRIPTION |
|---|---|---|
| name | John Doe fastball, 75 mph curve, low inside LH slider | name and/or description of pitch |
| pitch speed | 60 MPH, 90 MPH | speed of the pitch |
| spin angle $\phi$ | 0°, 214° | ball spin axis angle perpendicular to flight path |
| spin angle $\theta$ | 0°, 22.5°, 90° | ball spin axis angle parallel to flight path |
| spin rate | 0 RPM, 1800 RPM | how fast the ball spins |
| horizontal location | +12, −6 | horizontal location of pitch relative to target point |
| vertical location | +12, −6 | vertical location of pitch relative to target point |

Alternatively, there are several systems on the market which use a variety of sensors to collect the kinetic data of a moving ball or pitch. These systems read ball velocity, spin rate, and spin axis orientation—the exact data needed to replicate the pitch with a pitching machine. Until now, this data has only been used to compare one pitch or pitcher to another for competitive analysis and for tracking performance. However, in the present invention this data is integrated into the online system to create a database of real pitches and pitchers for use in batting practice with a pitching machine. This would allow batters to practice against the exact pitches and pitchers they may face in real games. It also provides hitters an opportunity to realistically face challenging pitchers they would never have the opportunity to see in person. By definition, the data collected by automated systems will be more accurate than the manual estimation methods previously disclosed.

Accordingly, as with individual pitches, pitchers are also saved in the database which can be accessed and selected by users. For example, pitchers may be defined as shown in in Table VI-B below.

TABLE VI-B

Pitcher Definition for Online Database

| PARAMETER | EXAMPLE VALUES | DESCRIPTION |
|---|---|---|
| name | John Doe, average high school pitcher, college level lefty | name and/or description of pitcher |
| description | John Doe, average high school pitcher, college level lefty | extended description of pitcher |
| number of pitches | 3, 10 | number of distinct pitches this pitcher can throw |
| picture | picture of pitcher, cartoon, logo | picture or cartoon representation of the pitcher |
| top speed | 60 MPH, 90 MPH | Fastest pitch the pitcher throws. Determined from set of available pitches. |

Figure 30:
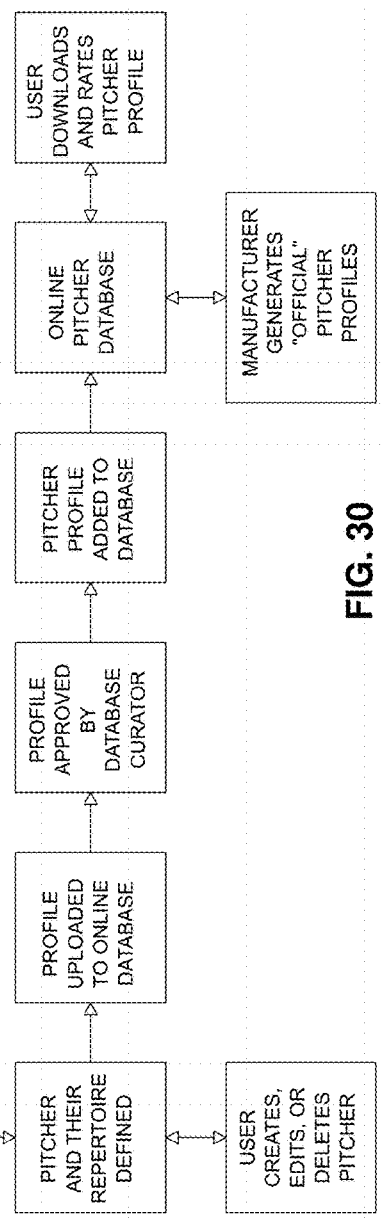
FIG. 30: Flowchart of online pitcher database.

Pitcher pictures may be captured by the same smart device that is running the app, assuming the device has a camera, or they may be downloaded from the internet or captured by other means. The online database is managed by the machine manufacturer to ensure quality. The manufacturer can also create a set of their own endorsed pitcher profiles, including profiles of actual professional pitchers. The database may be searched by profile source (manufacturer or user), quality, popularity, speed range, or description. Users may rate the profiles to create the quality ranking. For example, the flowchart in FIG. 30 shows the preferred system process.

Prior art has used touchscreens, both wired and wireless to control pitching machines. Modern cell phones and tablets provide a relatively low priced, high quality, mass produced wireless touchscreen interface for many products, including pitching machines. In addition, common phones and tablets also include a number of sensors that have not previously been used that allow physical pitch selection through gross motion input with the orientation sensor 106*a* or touchscreen 106*b*. This can be more convenient than using a GUI on a touchscreen, and using these sensors in conjunction with, or instead of, the traditional touchscreen interface provides a number of benefits, including operating the machine without needing to look at the GUI on the screen. For example, phones and tablets commonly include accelerometers and gyroscopes to sense motion and orientation which can be used to determine pitch type as explained below.

The physical interface can either be used to select from a list of pitches, or to create the pitch based on the physical input. As shown in FIG. 29, the user need only select the gross motion control option to enable gross motion capture.

Examples of picking from a list:

a. screen orientation used to select from a list of pitches, depending on whether screen is facing up 108*a*, down 108*b*, left 108*c*, right 108*d*, forward 108*e*, or back 108*f* b. tapping the phone X number of times to choose pitch list item number X c. holding X fingers against the screen to choose pitch list item number X d. Saying a number, "X" into the microphone to choose pitch list item number X Regardless of the particular gross motion option that is selected, gross motion is used as the user-entry port for selection of the desired pitch but the user. As explained below, a gross input database correlates inputs into the user-entry port with a pitch and a pitch is subsequently selected.

As shown in FIG. 32 as well as the table below, the various orientations of the phones face are preferably used to determine pitch break and direction. Preferably, the direction of the pitch break is roughly correlated to the direction of the screen, but the user may reset any pitch to any orientation. Similarly, a particular number of taps or finger touches on the screen can be used to indicate a particular pitch and the swipe or touch location is not necessarily limited by a location-specific data entry on the touchscreen. Conversely and as discussed above, pitch selection formats may require location-specific entry zones for selecting a pitch. For example, when various buttons are created to denote various pitches or pitcher type is selectable in a dropdown menu. It will also be appreciated that the touch number and pitch correlation shown is merely exemplary and the user has the option to configure the device however they see fit.

TABLE VII

Default Pitch Selection relative Screen Orientation and Screen Touches

| PITCH SELECTED | SCREEN ORIENTATION | SCREEN TOUCHES |
|---|---|---|
| Four Seam Fastball | Up | 1 |
| Sinker | Down | 2 |
| Curveball | Left | 3 |
| Changeup | Right | 4 |
| Split Finger | Front | 5 |
| Knuckleball | Rear | 6 |

Other touch and swipe combinations may be used to indicate certain pitches in the gross motion input system. For example, rather than correlating screen taps to preset pitches, a finger swipe may be used where finger count, direction of swipe and speed of swipe can indicate particular pitches. Although any number of combinations may be set by the user, an example of default swipes may align with traditional indicators used between pitchers and catchers. For example, a swipe of a single finger in a forward direction may be used to indicate fastball where the number one is traditionally used by a catcher when calling for a fastball. Similarly, a swipe of two fingers may be used to indicate a curveball with other numbers of finger swipes corresponding to other pitches.

Further, swipe direction and speed can be used with a one or more finger touches to indicate pitch type rather than total number of pitches. Preferably these swipe directions will also follow common pitch indications given by pitchers with their glove prior to throwing a pitch during warmups. Although persons having a skill in the art will understand these common signs, it will further be appreciated that these may also vary from user to user and the system can be personalized from user to user. For example, a swipe on the interface in an upward fashion will generally indicate a fastball whereas a swipe on the interface in a downward fashion will generally indicate a curveball. A slider or cut fastball may be indicated by a horizontal swipe in either direction corresponding to the direction of break and a changeup may be indicated by pressing and holding the swipe on the interface for an extended period of time.

As explained above, touch number can also be integrated with swipe direction. For example, two fingers swiped in a downward fashion may indicate a split finger pitch where a single finger swiped downwardly indicates a curveball. Additionally, two fingers swiped in an upward fashion may indicate a two seam fastball where a single finger swipe upward indicates a four seam fastball. Further, swipe speed can also be used to distinguish various pitches. For example, a fast swipe downward can be used to indicate a curveball whereas a slow swipe downward may be used to indicate a changeup.

Other examples of creating the pitch based directly on the physical input include:
a. Treating the phone as a Nintendo Wii controller. Rotating the phone quickly causes a pitch to be selected, with the pitch speed defined by the top rotational speed of the motion and the spin angle ($\phi$) defined by the direction of rotation.
b. Ball spin angle $\phi$ is set to the direction of the phone's touchscreen.
c. User says "fastball" or "curve" or "80 mph fastball" or "left handed curve" into the phone.

For voice commands, the phone's microphone may be used directly, or a wired or wireless headphone or similar device may be used. Software for voice recognition is already a standard feature on many phones and tablets. In operation, the voice recording is converted to text and the text is parsed for pitch names and speeds. The voice recording may also be parsed for new pitcher parameter values, such as "set top speed to 85 mph," which sets the maximum pitch speed parameter to 85 mph.

As discussed above, methods of automatically aiming a pitching machine given the ball's type, pitch parameters, and desired pitch location are known. This method uses tables of empirically determined acceleration values and standard equations of motion that assume constant accelerations during the ball's flight. The method also provided for a manually set correction factor to compensate for errors that may result from unusual ball condition or atmospheric conditions. The acceleration values from the table were simply multiplied by the correction factor before being used to calculate trajectory. Because the phone or tablet used to control the machine often includes temperature, pressure or GPS sensors, and usually internet connectivity, this correction factor can now be set to automatically compensate for varying atmospheric conditions.

A pitched ball's trajectory is dependent upon the density of the air it is traveling through as shown in the standard equation for Magnus force on a spinning ball below.

$$F=(4/3)*(4\pi^2 r^3 s \rho V)$$

In the above equation for Magnus force, F=Magnus force, r=ball radius, s=ball rotational velocity, $\rho$=air density, and V=ball velocity. This equation shows that the Magnus force and thus acceleration is linearly proportional with air density $\rho$. Because the correction factor is applied as a linear scalar to the acceleration table value, its value can be calculated according the calculation below.

$$CF_{default} = \rho_{local} / \rho_{table}$$

In the above equation $CF_{default}$=default correction factor, which can be overwritten by the user, $\mu_{local}$=air density at current time and location, and $\rho_{table}$=air density at time and location the acceleration tables were being compiled.

Local air density is affected by pressure, temperature, and humidity, all of which are influenced by altitude. Using the phone's GPS sensor and internet connectivity allows the control system to look up weather conditions for the machine's location and to adjust the automatic aiming as required. Even without internet connectivity, the GPS sensor can determine the machine's location, altitude and the time and date, and make an estimate of air density.

There are at least a dozen publicly available weather APIs, such as those from NOAA and Weather Underground, which provide highly localized and timely weather information. At this time, none provide air density directly, so it must be calculated from the weather data provided by these APIs. The control application obtains the device's current location from its GPS module, then uses one of the APIs to obtain current weather data. Air density is then calculated using standard equations.

Once air density is determined, the system may either adjust the correction factor described above and apply it to the values in the acceleration tables as part of the standard aiming procedure, or use empirically determined acceleration equations that more accurately define motion at that density than the standard equations described in prior art.

In an alternative embodiment that does not have internet connectivity, the GPS sensor can determine the machine's location and the time and date, and make an estimate of air density based on temperature and altitude using the ideal gas law equation. Further, a more complex, but potentially more accurate, method could be used to calculate multiple versions of the acceleration tables described above for different air densities. Once local air density is determined as by the smart device as described above, the most relevant acceleration tables are used. Linear interpolation may be used to find the table values when air density falls between two established tables.

In another aspect of the throwing machine and system described herein, innovative spur gears may be incorporated for aim adjustment. Examples of these spur gears are shown in in FIGS. 33 and 34. Throwing machines in the prior art have incorporated screws and worm gears to make small, precise adjustments to pitching machine aim. While these designs work as intended, they also introduce a limitation wherein neither design can be back driven due to friction. Nuts cannot be turned by pushing on a screw. Worms cannot be turned by turning the worm gear. This prevents the pitching machine from being swung around quickly and freely, which is necessary when the machine is used for defensive drills where the ball is thrown anywhere on the ball field.

Alternatively, spur gears provide the same precision aim adjustment of the prior art, but they can also be back driven, so they do not have the same limitation. FIG. 33 illustrates a 2 wheel machine with spur gears integrated into the machine's frame. FIG. 34A is a detailed view of the vertical adjustment and FIG. 34B is a detailed view of the horizontal adjustment.

The machine shown in FIG. 33 has three pin joints to orient the machine. Starting from the ground, the first joint controls horizontal aim with gooseneck 110 pivoting on tripod base 112. The second joint controls vertical aim with clevis 114 pivoting on gooseneck. The third joint controls the twist angle with machine frame 116 pivoting on clevis.

As detailed in FIG. 34A, gooseneck includes a flange 118 which pivots with the gooseneck. Flange includes a slot 120, through which passes the threaded shaft of clamping knob 122. The clamping knob is used to lock the joint in place and must be loosened before adjustments are made. Knob 124 is coupled to spur gear 126. Spur gear 128 is cut into the tripod base. The two spur gears are engaged so that turning knob causes gooseneck and flange to rotate at a reduced rate determined by the pitch ratio of the two spur gears.

FIG. 34B illustrates clevis rotates on horizontal pin 130. Because machine frame is coupled to clevis, the machine frame rotates with the clevis. Clevis includes a slot 132, through which passes the threaded shaft clamping knob 134. The clamping knob is used to lock the joint in place and must be loosened before adjustments are made. Knob 136 is coupled to spur gear 138. Spur gear 140 is cut into the clevis. The two spur gears are engaged so that turning knob causes clevis and flame to rotate at a reduced rate determined by the pitch ratio of the two spur gears.

Although there have been described particular embodiments of the present disclosure of a new and useful automatic game ball pitching machine, it is not intended that such references be construed as limitations upon the scope of this disclosure except as set forth in the following claims.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, as explained above, persons having ordinary skill in the art would understand that the spin angle calculations discussed above are based on a coordinate system and frame of reference and alternative coordinate system and different frame of reference could be used with the present invention without changing the overall principle of operation. Further, it will be appreciated that different versions of the display formats, shown in FIGS. 27A and 28, are disclosed in the various embodiments. It will be appreciated that other indicators, widgets, and designs could form display formats dependent on machine capability and user selections, and any such alternative format would merely be a change in the design appearance of the format as it is alternatively described in the specification for the optional embodiments and as it is generally recited in the claims. Accordingly, an alternative design for display formats would be a design choice that is within the scope of the display recited in the claims. Similarly, the user-entry port is not limited to buttons, dropdown menus and polar grids, but may vary based on design choice. Thus, the breadth and scope of the present invention should not be limited by any of the above-described exemplary embodiments, but should be defined only in accordance with the following claims appended hereto and their equivalents.

What is claimed is:

1. A method for controlling a set of different computer-controlled pitching machines with different pitching capabilities according to corresponding sets of control parameters, wherein processors in the computer-controlled pitching machines determine control signals using particular values for the control parameters, and wherein controllers in the computer-controlled pitching machines operate according to the control signals, the method comprising the steps of:
   providing a computer-controlled pitching machine from the set of different computer-controlled pitching machines;
   establishing a communication connection between a controller interface and the computer-controlled pitching machine, wherein the controller interface comprises a display screen, a user-entry port, a computer processor, a memory, and a communications module;
   receiving into the controller interface through the communications module a pitching machine dataset from the computer-controlled pitching machine;
   determining in the computer processor of the controller interface a pitching machine capability for the computer-controlled pitching machine based on the pitching machine dataset, wherein the pitching machine capability is determined from the different pitching capabilities for the set of different computer-controlled pitching machines;
   showing on the display screen a set of pitch options corresponding with the determined pitching machine capability of the computer-controlled pitching machine;
   receiving into the controller interface through the user-entry port a pitch dataset selected from the set of pitch options;
   determining in the computer processor of the controller interface a set of control parameters corresponding with the selected pitch dataset; and
   sending through the communications module the determined set of control parameters for the computer-controlled pitching machine.

2. The method according to claim 1, wherein the pitching machine dataset is selected from the group of datasets consisting of a plurality of predefined values for pitching machine parameters and a dataset identifier uniquely corresponding with the plurality of predefined values for pitching machine parameters, wherein the plurality of predefined values are stored in a database, wherein the pitching machine parameters define the different pitching capabilities, and wherein a touchscreen serves as the display screen and the user-entry port.

3. The method according to claim 2, wherein the pitching machine parameters are selected from the group of parameters consisting of a pitching machine type, a speed range, a spin rate range, a spin angle range, a ball type, a horizontal range, a vertical range, and any combination thereof, wherein the communications module can have at least one of a wireless communication protocol and a hardwired communication protocol with the computer-controlled pitching machine, wherein the database is stored in the memory, and wherein the dataset identifier defines a make, model, and series for a particular one of the computer-controlled pitching machines, and wherein the dataset identifier is correlated to the plurality of predefined values in the database for the pitching machine parameters of the particular one of the computer-controlled pitching machines.

4. The method according to claim 1, wherein the step for determining the set of control parameters is further comprised of defining a pitch speed, a spin rate, and a spin direction in the selected pitch dataset.

5. The method according to claim 1, wherein the step for determining the set of control parameters is further comprised of the steps of:
providing a pitcher database in the memory, wherein the pitcher database comprises a set of pitcher throw style descriptions correlated to a set of arm angles;
providing a pitch database in the memory, wherein the pitch database comprises a set of pitch names correlated to sets of control parameters, wherein the control parameters are comprised of a pitch speed, a spin rate, a spin angle relative to a direction of travel, and sets of spin orientation equations correlating the set of pitch names with the pitcher throw style descriptions for orienting a ball's spin axis perpendicular to the direction of travel;
parsing the selected pitch dataset into a selected pitcher throw style description and a selected pitch name;
retrieving from the pitcher database for the selected pitcher throw style description the corresponding arm angle;
retrieving from the pitch database for the selected pitch name the corresponding control parameters for the pitch speed, the spin rate, the spin angle relative to the direction of travel, and the spin orientation equation; and
calculating an orientation angle using the spin orientation equation corresponding with the selected pitch and the arm angle corresponding to the selected pitcher throw style description.

6. The method according to claim 1, further comprising the steps of:
defining at least one of an orientation sensor and a touchscreen of a mobile communication device as the user-entry port from which the pitch dataset can be selected from the pitch options;
providing a gross input database in the memory correlating a set of gross motion entries through the user-entry port with corresponding sets of control parameters;
receiving through the user-entry port a gross motion entry without any location-specific data entry; and
determining the set of control parameters in the gross input database corresponding with the gross motion entry.

7. The method according to claim 1, further comprising the steps of:
providing a plurality of display options for a plurality of controller interface formats for the computer-controlled pitching machine;
receiving a selection of a display option for a controller interface format; and
showing on the display screen the controller interface format according to the display option selection.

8. The method according to claim 7, wherein a first controller interface format is comprised of a pitch speed indicator, a spin rate indicator, and a spin direction indicator, and wherein a second controller interface format is comprised of a set of pitch names.

9. The method according to claim 8, wherein the controller interface is provided on a mobile computing device with a touchscreen, and wherein the second controller interface format is further comprised of at least one of a set of pitcher throw style descriptions and a set of gross motion actions.

10. A method for controlling a computer-controlled pitching machine with a set of control parameters that are used to calculate control signals using particular values for the control parameters, wherein controllers in the computer-controlled pitching machine operate according to the control signals, the method comprising the steps of:
providing a controller interface comprising a display screen, a user-entry port, a computer processor, a memory, and a communications module, wherein the controller interface is in an operative communication with the computer-controlled pitching machine;
providing a pitch database in the memory, wherein the pitch database comprises a set of pitch names correlated to sets of non-dimensional control parameters and a spin direction, wherein the sets of non-dimensional control parameters are comprised of a pitch speed percentage and a spin rate percentage, wherein the pitch speed percentage corresponding to each of the pitch names is a percentage of a maximum pitch speed for a pitcher, wherein the spin rate percentage corresponding to each of the pitch names is a percentage of a maximum spin rate for the pitcher, and wherein the spin direction is relative to a direction of travel;
receiving into the controller interface through the user-entry port a desired pitch name from the set of pitch names, a desired maximum pitch speed for the pitcher, and a desired maximum spin rate for the pitcher;
retrieving from the pitch database for the desired pitch name the corresponding non-dimensional control parameters for the pitch speed percentage and the spin rate percentage and the corresponding pitch spin direction;
calculating in the computer processor a pitch speed control amount according to the pitch speed percentage and the desired maximum pitch speed for the pitcher;
calculating in the computer processor a spin rate control amount according to the spin rate percentage and the desired maximum spin rate for the pitcher; and
calculating in the computer processor a spin direction control amount according to the pitch spin direction.

11. The method according to claim 10, wherein the operative communication is at least one of a hardwired communication connection and a wireless communication connection.

12. The method according to claim 10, further comprising the steps of:
receiving into the controller interface through the communications module a pitching machine dataset from the computer-controlled pitching machine; and
determining in the computer processor of the controller interface a top maximum pitch speed and a top maximum spin rate for the computer-controlled pitching machine based on the pitching machine dataset.

13. The method according to claim 12, further comprising the step of showing on the display screen a maximum pitch speed selector for the pitcher relative to the top maximum pitch speed and a maximum spin rate selector for the pitcher relative to the top maximum spin rate.

14. The method according to claim 10, further comprising the steps of:
setting for a series of pitches the desired maximum pitch speed for the pitcher and the desired maximum spin rate for the pitcher;
receiving into the controller interface through the user-entry port a series of desired pitch names for the series of pitches;
retrieving in series from the pitch database for the corresponding series of desired pitch names the corresponding series of non-dimensional control parameters for the pitch speed percentage and the spin rate percentage and the corresponding series of pitch spin directions; and
calculating in the computer processor the corresponding series of pitch speed control amounts, spin rate control amounts, and spin direction control amounts.

15. The method according to claim 14, further comprising the steps of:
defining at least one of an orientation sensor and a touchscreen of a mobile communication device as the user-entry port for the desired pitch name after the maximum pitch speed for the pitcher and the desired maximum spin rate for the pitcher have been set for the series of pitches;
providing a gross input database in the memory correlating a set of gross motion entries through the user-entry port with the corresponding set of control parameters;
receiving through the user-entry port a gross motion entry without any location-specific data entry; and
determining the set of control parameters in the gross input database corresponding with the gross motion entry.

16. The method according to claim 10, further comprising the steps of:
providing a pitcher database in the memory, wherein the pitcher database comprises a set of pitcher throw style descriptions correlated to a set of arm angles;
showing on the display screen at location specific selection zones the set of pitcher throw style descriptions;
receiving into the controller interface through the user-entry port a desired pitcher throw style selected from the pitcher throw style descriptions as shown on the display screen; and
retrieving from the pitcher database for the desired pitcher throw style the corresponding arm angle.

17. The method according to claim 16, further comprising the steps of:
correlating in the pitch database the pitch names with sets of spin orientation equations corresponding to the pitcher throw style descriptions, wherein the set of pitcher throw style descriptions is comprised of a throwing hand and at least one of a sidearm style and an overhand style, and wherein the sets of spin orientation equations depend on a throwing hand for each of the pitch names;
retrieving from the pitch database for the desired pitch name and the desired pitcher throw style the corresponding spin orientation equation; and
calculating an orientation angle using the arm angle from the pitcher database and the spin orientation equation from the pitch database, wherein the orientation angle defines a ball's spin axis perpendicular to the direction of travel.

18. A method for controlling a computer-controlled pitching machine with a set of control parameters that are used to calculate control signals using particular values for the control parameters, wherein controllers in the computer-controlled pitching machine operate according to the control signals, the method comprising the steps of:
providing a controller interface comprising a display screen, a user-entry port, a computer processor, a memory, and a communications module, wherein the controller interface is in an operative communication with the computer-controlled pitching machine;
providing a pitch database in the memory, wherein the pitch database comprises a set of pitch names correlated to sets of control parameters and a spin direction, wherein sets of non-dimensional control parameters are comprised of a pitch speed percentage and a spin rate percentage, wherein the pitch speed percentage corresponding to each of the pitch names is a percentage of a maximum pitch speed, wherein the spin rate percentage corresponding to each of the pitch names is a percentage of a maximum spin rate, and wherein the spin direction is relative to a direction of travel;
setting a desired maximum pitch speed and a desired maximum spin rate through the user-entry port in the controller interface;
receiving through the user-entry port in the controller interface a desired pitch name, wherein the desired pitch name is a selection from the set of pitch names;
retrieving from the pitch database for the desired pitch name the corresponding non-dimensional control parameters for the pitch speed percentage and the spin rate percentage and the corresponding pitch spin direction;
calculating in the computer processor a pitch speed control amount according to the pitch speed percentage and the desired maximum pitch speed, a spin rate control amount according to the spin rate percentage and the desired maximum spin rate, and a spin direction control amount according to the pitch spin direction; and
repeating the receiving step, the retrieving step, and the calculating step for a plurality of pitches, wherein the desired pitch name for each one of the pitches can be any pitch name from the set of pitch names.

19. The method according to claim 18, further comprising the steps of:
defining at least one of an orientation sensor and a touchscreen of a mobile communication device as the user-entry port for the selection of the desired pitch name for each one of the pitches;
providing a gross input database in the memory, wherein the gross input database comprises the set of pitch names correlated to a set of gross motion entries made through the user-entry port; and providing a gross motion entry to the user-entry port without any location-specific data entry to produce the selection of the desired pitch name from the set of pitch names.

20. The method according to claim 19, further comprising the steps of:

correlating in the gross input database each one of the pitch names in the set of pitch names to at least one of a different number of taps on the touchscreen and a different orientation of the mobile communication device; and showing on the display screen a maximum pitch speed selector and a maximum spin rate selector.

* * * * *